United States Patent
Tsujimoto et al.

[11] Patent Number: 6,051,289
[45] Date of Patent: Apr. 18, 2000

[54] LIQUID CRYSTALLINE POLYMER FILM, LAMINATE SHEET FOR OPTICAL ELEMENT USING SAME, AND OPTICAL ELEMENT USING THE LAMINATE

[75] Inventors: Yoshio Tsujimoto, Tokyo; Hiroyasu Ishikawa, Yokohama; Jun Mukai, Inagi; Teruaki Yamanashi, Hiratsuka; Toshihiro Ichizuka, Tokyo; Kenji Hosaki, Yokohama, all of Japan

[73] Assignee: Nippon Petrochemicals, Co., Ltd, Tokyo, Japan

[21] Appl. No.: 08/992,650

[22] Filed: Dec. 17, 1997

Related U.S. Application Data

[63] Continuation-in-part of application No. 08/315,706, Jan. 25, 1995, abandoned.

[30] Foreign Application Priority Data

Feb. 12, 1993 [JP] Japan ..................................... 5-64585
Feb. 12, 1993 [JP] Japan ..................................... 5-64586
Feb. 12, 1993 [JP] Japan ..................................... 5-64587

[51] Int. Cl.$^7$ ................................................. G09K 19/00
[52] U.S. Cl. .............................. 428/1; 427/163; 427/171; 427/322; 427/374.1; 427/393.5; 252/299.01; 264/2.6
[58] Field of Search ................................ 428/1; 427/163, 427/171, 322, 374.1, 393.5; 252/299.01; 264/2.7

[56] References Cited

U.S. PATENT DOCUMENTS

| | | | |
|---|---|---|---|
| 4,293,435 | 10/1981 | Portugall et al. | 252/299.01 |
| 4,443,065 | 4/1984 | Funada et al. | 349/76 |
| 4,702,558 | 10/1987 | Coles et al. | 349/22 |
| 4,995,705 | 2/1991 | Yoshinaga et al. | 349/22 |
| 5,054,888 | 10/1991 | Jacobs | 349/126 |
| 5,132,147 | 7/1992 | Takiguchi | 427/393.5 |
| 5,133,895 | 7/1992 | Ogawa et al. | 252/299.4 |
| 5,193,020 | 3/1993 | Shiozaki et al. | 349/117 |
| 5,206,752 | 4/1993 | Itoh et al. | 349/183 |

FOREIGN PATENT DOCUMENTS 0 457 607 A2  11/1991  European Pat. Off. .
4-22917  1/1992  Japan .

*Primary Examiner*—Leszek Kiliman
*Attorney, Agent, or Firm*—Scully, Scott, Murphy & Presser

[57] ABSTRACT

To provide a film for optical element made of liquid crystal polymer whose productivity and economical efficiency are improved; a laminated sheet formed by bonding this film to a polarizing plate; and an optical element which can be optically inspected, and used under an environment of high temperature and high moisutre, and whose surface hardness is so high that the surface is not easily damaged. A long laminated sheet for optical element comprising a liquid crystal polymer layer, and a polarizing film layer; and a long laminated sheet for optical element comprising at least a liquid crystal polymer film layer oriented in the direction oblique to the MD direction at a given angle, and a polarizing film layer. An optical element having a laminated structure formed by laminating a layer of a cured acrylic resin having optical isotropy, an orientated liquid crystal polymer layer, a layer of pressure-sensitive adhesive, and a translucent base layer in that order, and a long laminated sheet for optical element having a laminated structure formed by laminating a layer of a cured acrylic resin having optical isotropy; an oriented liquid crystal polymer layer; a layer of pressure-sensitive adhesive; and a translucent base layer in that order, and a containing liquid crystal polymers orientated in the MD direction at an arbitrary angle.

12 Claims, 1 Drawing Sheet

LIQUID CRYSTALLINE POLYMER FILM, LAMINATE SHEET FOR OPTICAL ELEMENT USING SAME, AND OPTICAL ELEMENT USING THE LAMINATE

This is a continuation-in-part of U.S. patent application, Ser. No. 08/318,706, filed Jan. 25, 1995 now abandoned.

FIELD OF THE INVENTION

The present invention relates to a long, continuous, liquid crystalline polymer film oriented at a desired angle which film is to be used for an optical element such as a color compensator for a liquid crystal display, a viewing angle compensator for a liquid crystal display, a retardation plate, a half-wave plate, a quarter-wave plate or an optical rotator.

The present invention also relates to a long, continuous, film-like laminate sheet including a liquid crystalline polymer layer which sheet is to be used for an optical element such as a color compensator for a liquid crystal display, a viewing angle compensator for a liquid crystal display, a retardation plate, a half-wave plate, a quarter-wave plate or a rotator.

Particularly, the invention relates to a long, continuous, laminate sheet for an optical element which sheet is a laminate of a liquid crystalline polymer layer and a polarizing film layer, the liquid crystalline polymer layer being oriented in a specific direction.

The present invention is further concerned with an optical element such as, for example, a color compensator for a liquid crystal display, a viewing angle compensator for a liquid crystal display, a retardation plate, a half-wave plate, a quarter-wave plate or an optical rotator, as well as an optical element to be used for such optical element.

PRIOR ART

Conventional films for optical elements having optical functions such as a color compensator for a liquid crystal display, a viewing angle compensator for a liquid crystal display, a retardation plate, a half-wave plate, a quarter-wave plate and an optical rotator all utilize utilize uniaxially oriented films of polymers such as, for example, polycarbonates and polyvinyl alcohols. Therefore, the direction of the orientation is restricted by in which direction the polymers are stretched. For example, in the case of a long film, the orienting direction of the film is inevitably limited corresponding to the stretched direction of the film.

In the case of use as a liquid crystal display for example, the above situation has also been true of a polarizing sheet which is often used in a laminated state to the film for optical element mentioned above. The polarizing sheet also utilizes a uniaxially stretched film of a polymer such as a polyvinyl alcohol or a polyester, e.g. PET, with iodine or a dichroic dye impregnated therein. Therefore, its transmission axis direction as a polarizer is restricted by the stretched direction of the film. For example, in the case of a long film, the transmission axis direction of the polarizer is limited to transverse direction (TD), assuming that the stretched direction of the film is machine direction (MD). That is, as long as the aforesaid film for opticl element and the aforesaid polarizing sheet each utilized a uniaxially stretched film, the orienting direction or transmission axis direction thereof is inevitably limited by the stretched direction of the film.

In the case of a long film, its stretched direction is usually the longitudinal direction of the film, i.e. MD direction, (the circumstances which will be described later are also applied to the case where the film stretching direction is TD direction).

When the foregoing film for optical element and polarizing sheet are laminated together for use as an optical element for a liquid crystal display for example, it is necessary that the orienting direction of the film for optical element and the transmission axis direction of the polarizing sheet be combined at a specific angle.

Accordingly, as long as a uniaxially stretched film with the orientation direction or transmission axis direction fixed in TD or MD is utilized, it has actually been difficult heretofore to produce a long laminate of films directly. Heretofore, in view of the above point, there has been adopted a method wherein square piecies are cut out respectively from a uniaxially stretched film at a predetermined angle and then each of them are fixed with arranging their optical axis at a predetermined angle. (see, for example, U.S. Pat. No. 5,193,020).

Although such conventional cutting-out and laminating operations are performed manually and carefully, the occurrence of rejected products has heretofore been unavoidable because it is necessary to make an angular adjustment of directions accurately. It has also been impossible inevitably to expect any improvement of productivity.

Besides, since it is necessary that a square piece be cut out obliquely from a long, uniaxially stretched film, the loss of film is great. This has also been a problem.

Description is again directed to the prior art though tautologically.

The optical element is constituted by laminating a polarizing sheet with an element such as, for example, a retardation plate of a liquid crystalline polymer film. This is as described in the foregoing U.S. Pat. No. 5,193,020 for example.

On the other hand, the polarizing sheet and the retardation plate each possess an optical directionality. In the polarizing sheet, the optical directionality is represented by a transmission axis, while in such an element as the retardation plate it is represented by an optical axis. It goes without saying that the aforesaid lamination is performed while taking into account the optical directionality of the polarizing sheet and that of the retardation plate. Generally, for example in the case of an STN type liquid crystal display, the transmission axis of the polarizing sheet and the optical axis of the retardation plate (to be exact, an optical axis of the retardation plate at the surface which is in contact with the polarizing sheet in the case where the optical axis is twisted) are set so as to cross each other at an angle of 45°. The above angle 45° may be a little changeable according to the optical properties of the film and the polarizer, and assembling condition of the film and so on. However, this above angle could not be 90° or 180°.

This adjustment is important because outside this set value it would be impossible to attain the expected optical effect.

On the other hand, most of the commercially available, mass-produced polarizing sheets are in a rolled form of a long sheet, and their transmission axis all extend in a direction perpendicular to the longitudinal direction (MD direction) of the long sheet, namely in the TD direction.

The final optical element obtained by laminating the polarizing sheet and the retardation plate to each other is usually in a rectangular shape for forming the screen of the liquid crystal display.

According to the prior art, as described in the foregoing U.S. patent, a rectangular sheet as the polarizing sheet is cut out simply at right angles from a rolled, long sheet along the longitudinal direction thereof (the said rectangular sheet is sometimes called a cut sheet). Therefore, the transmission axis of this rectangular polarizing sheet is parallel (or perpendicular) to the sides thereof.

In the case of the retardation plate, as shown also in the foregoing U.S. patent, an optical axis thereof is set while considering the transmission axis of the polarizing sheet to be laminated to the retardation plate and a liquid crystalline polymer film is oriented on a substrate which has been cut out beforehand in a rectangular shape (corresponding to the above rectangular shape of the polarizing sheet). To be more specific, the orientation is made so that the optical axis of the retardation plate is at an angle of 45° relative to the sides of the rectangular sheet.

In the foregoing U.S. patent, a rectangular support sheet is used and the shape of a liquid crystalline polymer film formed thereon is also a rectangular sheet corresponding thereto. Industrially, however, a long sheet form capable of being rolled is suitable.

When a liquid crystalline polymer film is formed and oriented on a long support sheet, it is natural that the orientation should be parallel to the long sheet. In other words, it is natural that the optical axis of the long sheet should extend in the MD direction.

This is inevitable because a treatment parallel (or perpendicular) to the long film is easy and simple even if the orientation is performed by a rubbing treatment.

Also as to the foregoing commercially available, long polarizing sheet, the reason why its transmission axis extends in the TD direction is that a drawing treatment for the polymer film which constitutes the polarizing sheet is performed in parallel with the long film (in the MD direction). The reason why the drawing treatment is performed in the MD direction is because it is easy and convenient to do so.

Actually, a long liquid crystalline polymer film has heretofore not been produced no matter in which direction it may be oriented. The applicant in the present case was the first to produce it (those described in the foregoing U.S. patent are only rectangular ones).

In the case of an optical film oriented simply in parallel with the longitudinal direction of a long sheet, namely an optical film having an optical axis extending in the MD direction, it is necessary that the film be cut beforehand in a rectangular shape and cut out at an angle of 45° in the MD direction in order to laminate it to the foregoing rectangular polarizing sheet havingf a transmission axis parallel (or perpendicular) to the sides thereof.

However, cutting out the film at such an angle of 45° results in a large cut-out loss (waste residue). In this case, moreover, it is necessary that the lamination be made after cutting out in the rectangular shape.

In the case of a liquid crystal display, moreover, the surface of an orienting substrate which comes into contact with the liquid crystal is subjected to a rubbing treatment for controlling the liquid crystal molecules as display elements physically or physicochemically.

For example, the rubbing treatment is performed by rubbing a suitable polyimide film formed on the orienting substrate, using cloth or the like.

Conventional orienting substrates are sometimes rigid substrates such as glass substrates, and the rubbing treatment is applied to such a substrate which has been cut beforehand in a square shape for example. Therefore, it is necessary that the formation of a polyimide film or the like onto the orienting substrate be done for each substrate using a printing machine or a spin coater, thus requiring the use of an expensive apparatus. For example, the use of a spin coater is uneconomical because the scattering of a considerable amount of a coating material is unavoidable in view of its mechanism.

The method of making lamination through an adhesive also involves problems such as delamination under high temperature and high humidity conditions over a long time and the deterioration of optical properties such as foaming.

Further, the liquid crystalline polymer layer as an optical element is thin, so with this layer alone, it is not always possible to attain a satisfactory mechanical strength.

OBJECTS OF THE INVENTION

It is an object of the present invention to provide a film for optical element improved in both productivity and economy and a laminate sheet of the said film and a polarizing plate.

Also, in view of the present situation of such optical elements of liquid crystalline polymers as mentioned above, it is another object of the present invention to provide an optical element which permits direct optical inspection and is employable even in high temperature and high humidity environment, high in surface hardness and difficult to be flawed.

SUMMARY OF THE INVENTION

The present invention, in the first aspect thereof, relates to a long liquid crystalline polymer film which is oriented obliquely at a predetermined angle relative to the MD direction.

The present invention, in the second aspect thereof, relates to a long laminate sheet for optical element having at least a layer of a liquid crystalline polymer film which is oriented obliquely at a predetermined angle relative to the MD direction, and also having a layer of a polarizing film.

The present invention, in the third aspect thereof, relates to a long laminate sheet for optical element having at least a liquid crystalline polymer layer and a layer of a polarizing film formed of a stretched polymer.

The present invention, in the fourth aspect thereof, relates to an optical element includdng a laminate structure wherein a cured acrylic resin layer having an optical isotropy, an oriented liquid crystalline polymer layer, an adhesive or pressure-sensitive adhesive layer and a light-transmitting substrate layer are laminated in this order.

The present invention, in the fifth aspect thereof, relates to a long laminate sheet for optical element including a laminate structure wherein a cured acrylic resin layer having optical isotropy, an oriented liquid crystalline polymer layer, an adhesive or pressure-sensitive adhesive layer and a light-transmitting substrate layer are laminated in this order, the liquid crystalline polymer being oriented at an arbitrary certain angle, preferably obliquely, relative to the MD direction.

The present invention, in the sixth aspect thereof, relates to an optical element including a laminate structure wherein a cured acrylic resin layer having optical isotropy and laminated to a polarizing film through an adhesive or pressure-sensitive layer and a light-transmitting substrate layer are laminated in this order, or a long laminate sheet for optical element including a laminate structure wherein a cured acrylic resin layer having an optical isotorpy and laminated -to a polarizing film through a hardenable pressure-sensitive adhesive layer and a light-transmitting substrate layer are laminated in this order, the liquid crystalline polymer being oriented at an arbitrary certain angle, preferably obliquely, relative to the MD direction.

Figure 1:
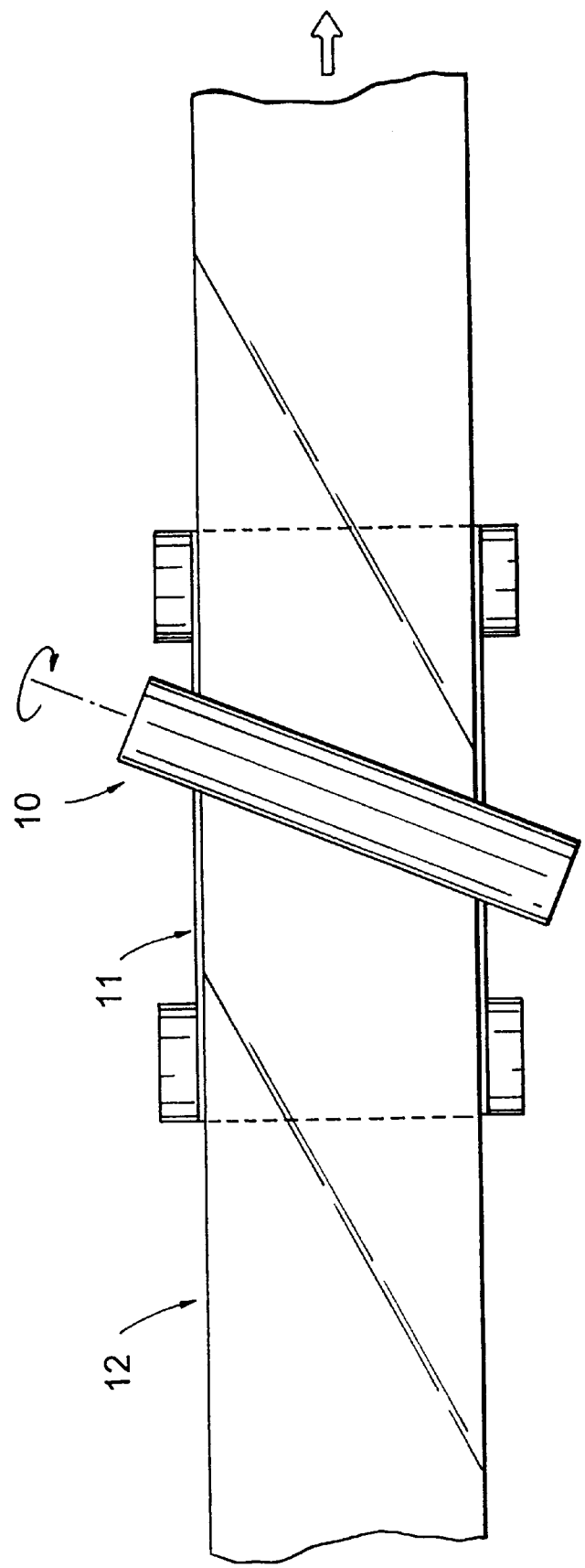
FIG. 1 is a plan view of an apparatus for rubbing a long film-like orienting substrate obliquely relative to the MD direction of the substrate.

In the same figure, the numeral 10 denotes a rubbing roll, numeral 11 denotes an orienting substrate conveyance stage, and numeral 12 denotes a long film-like orienting substrate.

PREFERRED EMBODIMENTS OF THE INVENTION

The preesnt invention will be described in more detail hereinunder.

A resin layer having an optical function such as a color compensator for a liquid crystal display, a viewing angle compensator for a liquid crystal display, a retardation plate, a half-wave plate, a quarter-wave plate or an optical rotator is constituted by a liquid crystalline polymer layer which is oriented at an arbitrary angle and which is constituted by a long film. The liquid crystalline polymer layer is oriented at an arbitrary angle relative to the MD direction of the said long film. The "long film" means a continuous film having a certain length, and industrially it means a continuous film capable of being fed in a rolled form. The rolled form is not an essential condition. The film may be a suitably folded, continuous film. As the case may be, the film is as long as 10,000 m.

Film oriented obliquely in the MD direction according to the present invention can be cut out in parallel with or perpendicularly to the MD direction and hence the proportion of waste residue can be reduced.

The liquid crystalline polymer to be laminated to an orienting substrate is a thermotropic liquid crystalline polymer which exhibits liquid crystallinity when melting. In a melted state the liquid crystal phase may take any molecular orientation structures such as smectic, nematic, twisted nematic (cholesteric) and discotic. Here there is selected a thermotropic liquid crystalline polymer whose liquid crystal phase molecular orientation is maintained by reducing the temperature from the melting temperature down to a level lower than the glass transition temperature of the polymer.

The liquid crystalline polymer has such a self-memorizing property, so if the liquid crystalline polymer is melted to develop its liquid crystal phase after lamination thereof to a rubbing-treated orienting substrate, the liquid crystal phase thus developed will be oriented correspondingly to the rubbed surface. Then, by reducing the temperature down to a level lower than the glass transition temperature of the liquid crystalline polymer, the orientation of the liquid crystal phase will be fixed and retained.

As the thermotropic liquid crystalline polymer to be laminated with the rubbing-treated orienting substrate there may be used any liquid crystalline polymer if only its liquid crystal phase molecular orientation is maintained by reducing the temperature down to a level lower than the glass transition temperature of the polymer. That is, such a liquid crystalline polymer assumes a glassy state at a temperature lower the its liquid crystal transition temperature.

For use as such as an optical element as a retardation plate, a half-wave plate or a quarter-wave plate, it is desirable to use a liquid crystalline polymer which exhibits a uniform nematic phase of monodomain in the state of liquid crystal.

The molecular weight of the liquid crystalline polymer is in the range of 0.05 to 3.0, preferably 0.07 to 2.0, in terms of inherent viscosity as determined at 30° C. in any of various solvents, e.g. mixed phenol/tetrachloroethane (60/40) solvent. If the inherent viscosity is smaller than 0.05, the stength of the resulting liquid crystalline polymer will be low, and if it exceeds 3.0, there will arise problems such as deteriorated orientability and increase of the time required for orientation. Thus, such values outside the above range are not desirable.

The glass transition temperature of the liquid crystalline polymer is also an important factor, which exerts an influence on the stability of orientation after fixed. Though depending also on the working temperature, when the resulting product is used at room temperature, it is generally preferred that the glass transition temperature be not lower than room temperature, more preferably be not lower than 50° C. In the case where the glass transition temperature is lower than room temperature and the resulting product is used at room temperature, there may occur a change in the state of orientation once fixed. Due to the development of glass phase subsequent to the liquid crystal phase, the orientation can be fixed by cooling without affecting the state of orientation.

A liquid crystalline polymer suitable for use as a color compensator for eliminating the coloration of a liquid crystal display or as an optical element such as an optical rotator for rotating the direction of linear polarization or that of elliptic polarization, contains an optically active unit. Such a liquid crystalline polymer is selected from a composition which comprises a nematic liquid crystalline polymer capable of being easily fixed its oriented state and a predetermined amount of an optically active substance incorporated in the liquid crystalline polymer, and an optically active liquid crystalline polymer having an optically active group in its molecular chain such as side chain or main chain, exhibiting a uniform, twisted nematic orientability of monodomain and capable of being fixed its oriented state easily.

Since the above color compensator or optical rotator is required to exhibit a twisted nematic structure, it is necessary for the constituent liquid crystalline polymer to contain an optically active unit, provided in some particular way of use of such optical element it is not always essential for the liquid crystalline polymer to contain an optically active unit. In other words, it is not essential for the liquid crystalline polymer used in the present invention to contain an optically active unit.

The twist angle or twist direction of the liquid crystalline polymer can be adjusted by selecting a suitable proportion of an optically active unit contained in the polymer or selecting suitable kind and amount of an optically active compound to be mixed with the polymer. The proportion of an optically active unit is preferably in the range of 0.1 to 50 wt %, more preferably 0.5 to 30 wt %. The optically active unit as referred to herein sometimes indicates an optically active compound incorporated in the polymer separately or in some case it may indicate an optically active group present in the main chain or side chain of the liquid crystalline polymer. Thus, by imparting optical activity to the polymer or by adjusting the proportion of the optically active unit in the polymer composition, it is made possible to adjust the twist angle or twist direction of the polymer to a desired value of not smaller than 0°.

The twist direction of the liquid crystalline polymer film is defined as follows. When the polarization plane of light incident perpendicularly to the film surface passes through the film while changing in the clockwise direction, the twist angle is defined to be a right-hand twist or minus.

In the case where the resulting product is to be used as an optical element such as a color compensator for eliminating the coloration of a liquid crystal display or an optical rotator for rotating the direction of linear polarization or that of elliptic polarization, there are mentioned two kinds of liquid crystalline polymers suitable for use, one of which is an optically active polymer having an optically active group and exhibiting a twisted nematic liquid crystallinity, and the other is a composition of a base polymer not having an optically active group and exhibiting a nematic liquid crystallinity and an optically active compound.

Where the product is to be used as a color compensator for a liquid crystal display, in order to obtain a high quality black-and-white display it is necessary to strictly control the optical parameter of the liquid crystalline polymer layer. It is necessary that the molecules of the liquid crystalline polymer be of a helical structure having a helical axis in the direction perpendicular to the substrate, that the twist angle be in the range of 300 to 300° and that the product Δn·d of birefringence Δn and thickness d of the liquid crystalline polymer layer be in the range of 0.01 to 3.0 μm. Particularly, when the use is for TN, the twist angle is usually in the range of 30° to 150°, preferably 40° to 120°, and Δn·d is usually in the range of 0.05 to 3.0μm, preferably 0.1 to 2.8cm. On the other hand, when -the use is for STN, the twist angle is usually in the range of 150° to 300°, preferably 170° to 280°, and Δn·d is usually in the range of 0.1 to 1.5 μm, preferably 0.3 to 1.2 μm. If the foregoing liquid crystalline polymer or composition thereof is utilized, it is easy to fix orientation and obtain a predetermined film thickness.

In the case where the resulting product is to be used as a viewing angle compensator for a liquid crystal display or a cholesteric filter, there is used a liquid crystalline polymer layer having a twist angle of not smaller than 360°. In the case of a half-wave plate, a quarter-wave plate or a retardation plate not requiring optical rotatory power, there is used a nematic liquid crystalline polymer not having a twisted structure, provided it is necessary to control the optical parameter strictly. In connection with the optical parameter, it is necessary that Δn·d of the liquid crystalline polymer layer be in the range of 0.01 to 10 μm, preferably 0.1 to 5 μm.

Anyhow, such a strict control of the optical parameter can be done easily if only there is used a liquid crystalline polymer.

Suitable materials employable in the present invention will be exemplified below. More specifically, liquid crystalline polymers not having an optically active group and exhibiting a nematic liquid crystallinity, optically active compounds to be incorporated in a base polymer which is a liquid crystalline polymer not having an optically active group and exhibiting a nematic liquid crystallinity, and liquid crystalline polymers having an optically active group and exhibiting a twisted nematic liquid crystallinity, will be successively described below.

As examples of polymers to be used there are mentioned main chain type liquid crystalline polymers such as polyesters, polyamides and polyester-imides, side chain type liquid crystalline polymers such as polyacrylates, polymethacrylates, polymalonates and polysiloxanes and the like, which are not opticaly active.

Above all, in view of the easiness of preparation, orientability and glass transition temperature, polyesters are particularly preferred. Most preferred polyesters are those which contain ortho-substituted aromatic units as constituents, but also employable are those which contain aromatic units having bulky substituent groups or aromatic units having fluorine or fluorine-containing substituent groups, as constituents in place or such ortho-substituted aromatic units. The "ortho-substituted aromatic units" as referred to herein means structural units wherein main chain-constituting bonds are ortho to each other. Examples are the following catechol, salicylic acid and phthalic acid units as well as substituted derivatives thereof:

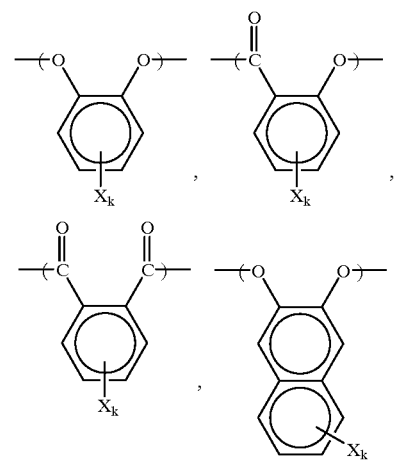

wherein X represents hydrogen, halogen, e.g. Cl or Br, an alkyl or alkoxy group having 1 to 4 carbon atoms, or phenyl, and k is 0 to 2.

The following are particularly preferred:

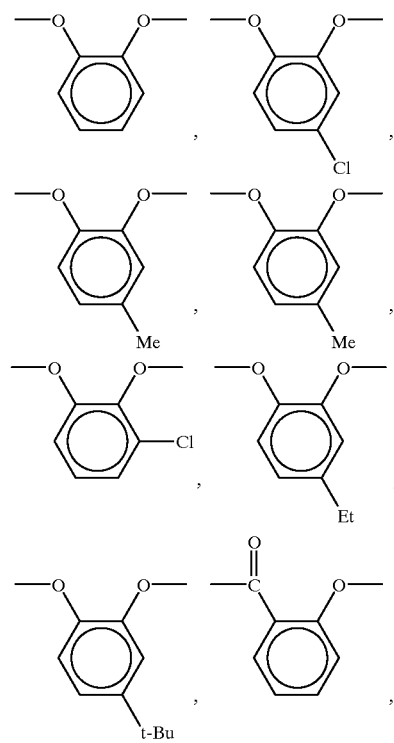

-continued

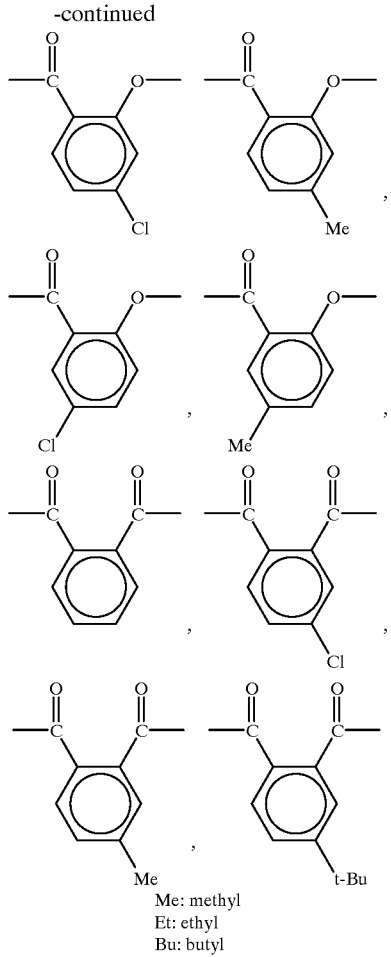

Me: methyl
Et: ethyl
Bu: butyl

Also, examples of the polyester used preferably in the present invention there are mentioned those containing as repeating units (a) a structural unit (hereinafter referred to as "diol component") derived from a diol and a structural unit ("dicarboxylic acid component" hereinafter) derived from a dicarboxylic acid and/or (b) a structural unit ("hydroxycarboxylic acid component" hereinafter) derived from a hydroxycarboxylic acid containing both carboxyl and hydroxyl groups in one unit. Preferably, these polyesters further contain the foregoing ortho-substituted aromatic unit.

As examples of the diol component there are mentioned the following aromatic and aliphatic diols:

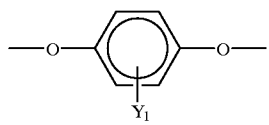

wherein Y represents hydrogen, halogen, e.g. Cl or Br, an alkyl or alkoxy group having 1 to 4 carbon atoms, or phenyl, and l is 0 to 2,

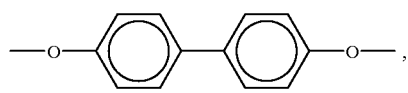

-continued

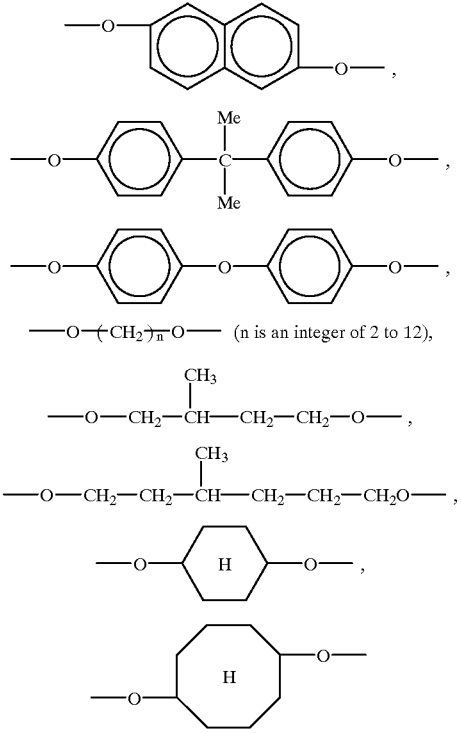

Particularly, the following are preferred:

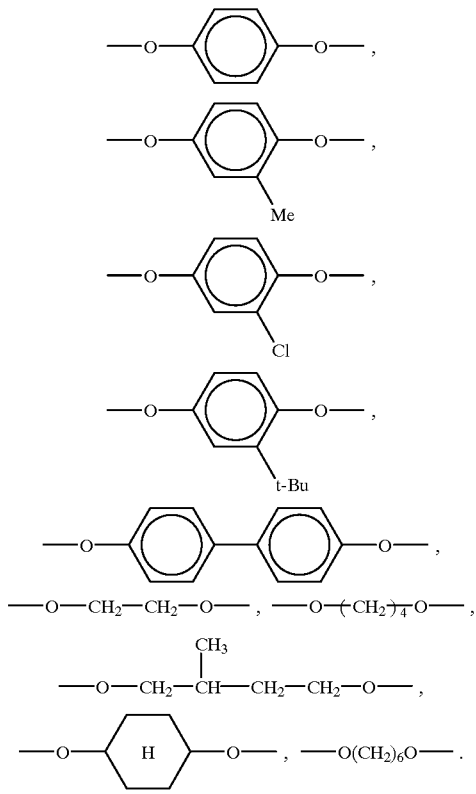

As examples of the dicarboxylic acid component, the following may be mentioned:

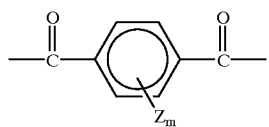

wherein Z represents hydrogen, halogen, e.g. Cl or Br, an alkyl or alkoxy group having 1 to 4 carbon atoms, or phenyl, and, m is 0 to 2,

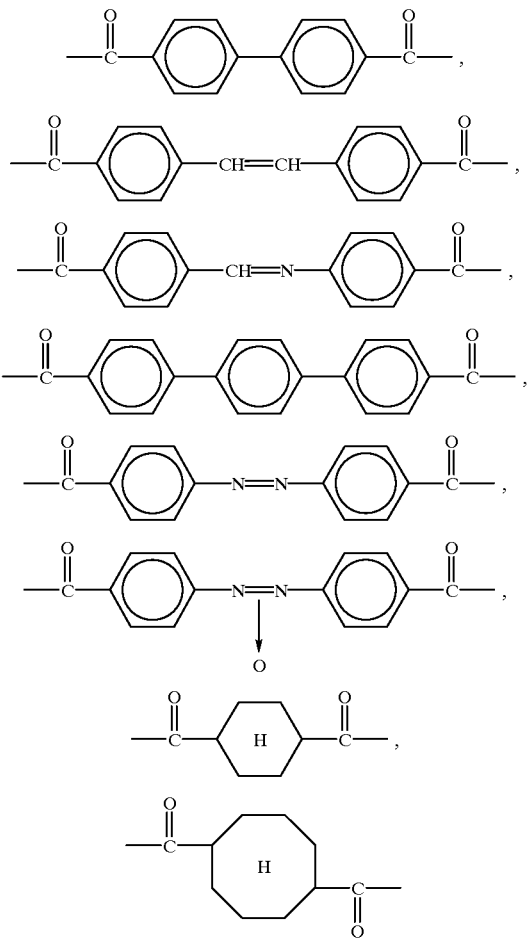

Particularly, the following are preferred:

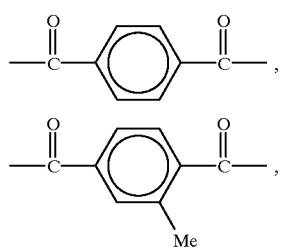

-continued

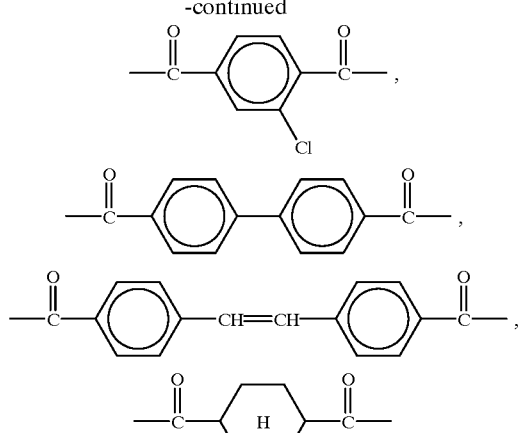

As examples of the hydroxycarboxylic acid component, the following units may be mentioned:

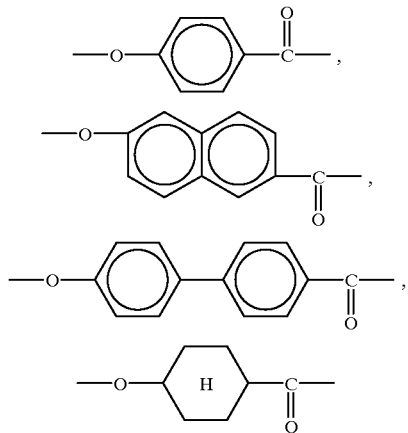

The dicarboxylic acid to diol mole ratio is approximately 1:1 like that of polyesters commonly used (carboxyl group to hydroxyl group ratio in the case of using a hydroxycarboxylic acid). The proportion of ortho-substituted aromatic units in the polyester is preferably in the range of 5 to 40 mole %, more preferably 10 to 35 mole %. In the case where the said proportion is smaller than 5 mole %, a crystal phase tends to appear under the nematic phase, so such proportion is not desirable. A proportion larger than L10 mole % is not desirable, either, because the polymer will no longer exhibit liquid crystallinity. The following are typical examples of polyesters which may be used in the present invention:

Polymer consisting essentially of the following structural units:

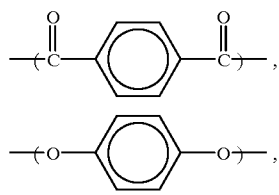

-continued

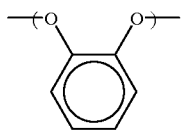

Polymer consisting essentially of the following structural units:

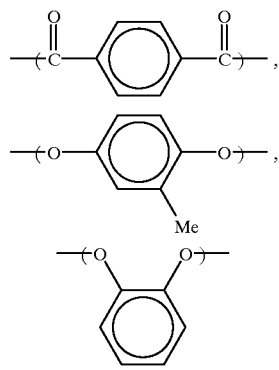

Polymer consisting essentially of the following structural units:

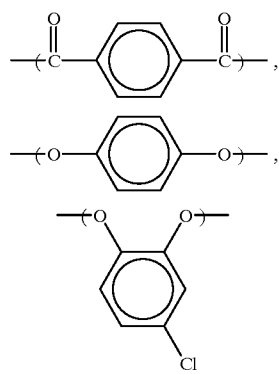

Polymer consisting essentially of the following structural units:

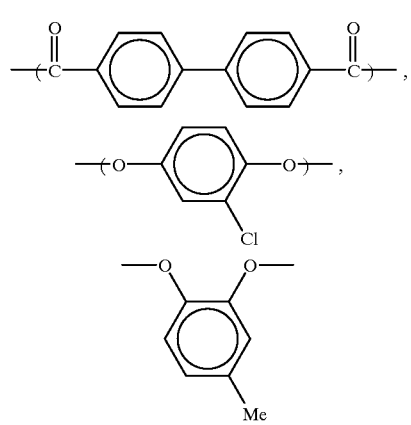

Polymer consisting essentially of the following structural units:

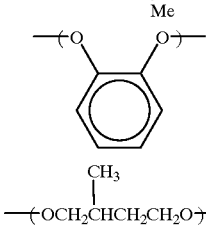

$$-\!\!+\!\!OCH_2CHCH_2CH_2O\!\!+\!\!-\ ,$$

with CH$_3$ substituent,

Polymer consisting essentially of the following structural units:

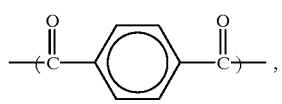

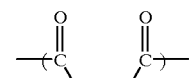

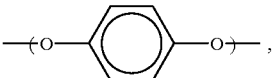

Polymer consisting essentially of the following structural units:

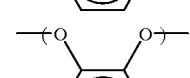

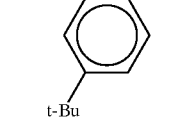

-continued

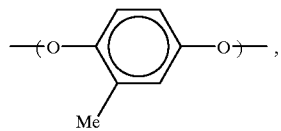

Polymer consisting essentially of the following structural units:

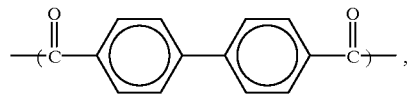

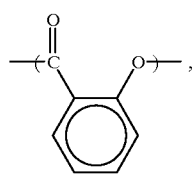

Polymer consisting essentially of the following structural units:

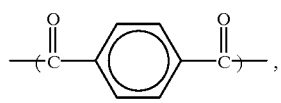

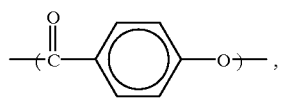

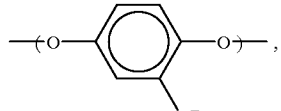

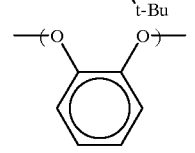

Also preferred are polymers which, in place of ortho-substituted aromatic units, contain as repeating units such bulky substituent-containing aromatic units or aromatic units containing fluorine or fluorine-containing substituents as shown below:

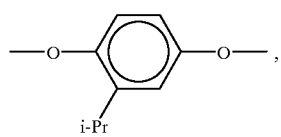

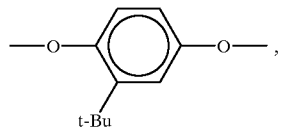

-continued

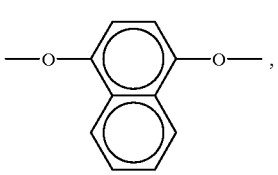

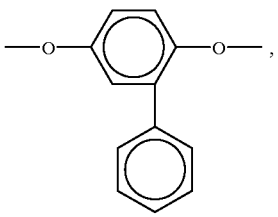

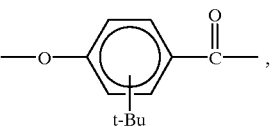

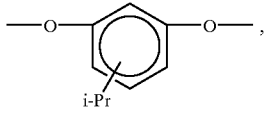

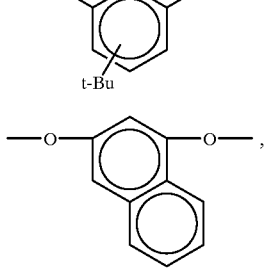

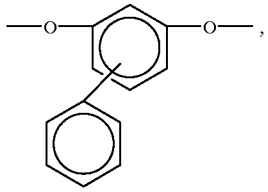

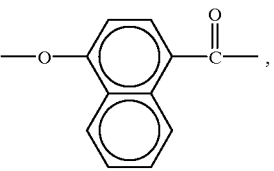

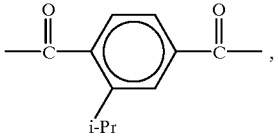

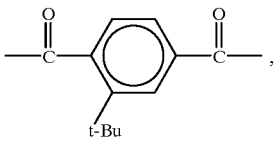

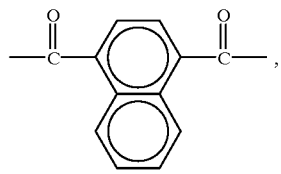

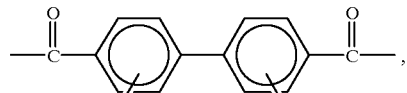

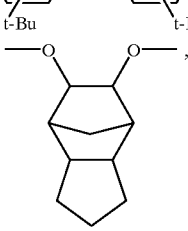

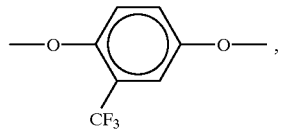

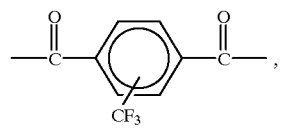

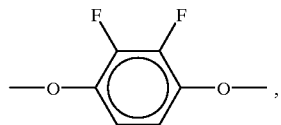

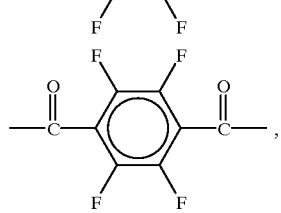

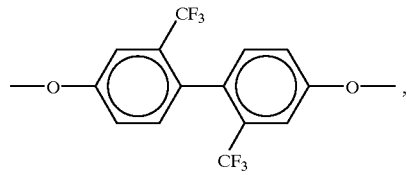

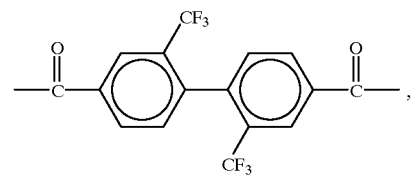

The polymers exemplified above range in molecular weight preferably from 0.05 to 3.0, more preferably 0.07 to 2.0, in terms of inherent viscosity as determined at 30° C. in a solvent, e.g. a mixed phenol/tetrachloroethane [60/40 (weight ratio)] solvent. An inherent viscosity lower than 0.05 is not desirable because the strength of the resulting film of liquid crystal polymer will be low, while if the inherent viscosity is higher than 3.0, there will arise such problems as the deterioration of orientatability and an increase of the time required for orientation because of too high viscosity during the formation of liquid crystal.

However, a lower molecular weight will do if it can be made into a high molecular weight by crosslinking for example after fixing of the orientation.

How to prepare the polymer used in the present invention is not specially limited. There may be adopted any of the polymerization processes known in this field, e.g. a melt polymerization process or an acid chloride process using an acid chloride of a corresponding dicarboxylic acid.

According to a melt polycondensation process, the polyester can be prepared by polymerizing a corresponding dicarboxylic acid and an acetylated compound of a corresponding diol at a high temperature and in a high vacuum. The molecular weight thereof can be adjusted easily by controlling the polymerization time or the feed composition. For accelerating the polymerization reaction there may be used a known metal salt such as sodium acetate. In the case of using a solution polymerization process, the polyester can be prepared easily by dissolving predetermined amounts of a dicarboxylic acid dichloride and a diol in a solvent and heating the resulting solution in the presence of an acid acceptor such as pyridine.

An explanation will now be made about an optically active compound which is incorporated in the nematic liquid crystalline polymers exemplified above for imparting twist thereto. Typical examples are optically active low-molecular compounds. Any compound having optical activity can be used in the present invention, but from the standpoint of compatibility with the base polymer it is desirable to use optically active, liquid crystalline compounds. The following are concrete examples:

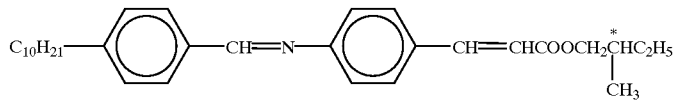

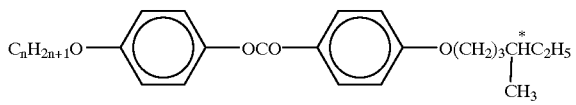

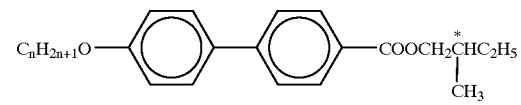

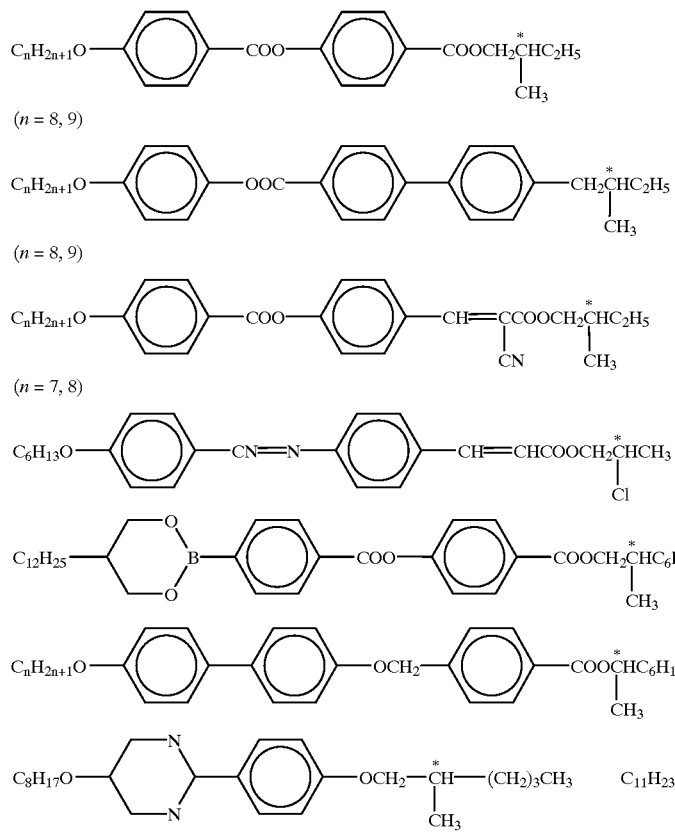

cholesterol derivatives.

As examples of the optically active compound used in the present invention there also may be mentioned optically active high-molecular compounds. Any high polymer may be used if only it contains an optically active group in the molecule, but when the compatibility with the base polymer is taken into account, it is desirable to use a polymer which exhibits liquid crystallinity. Examples are the following liquid crystalline polymers having optical activity: polyacrylates, polymethacrylates, polymalonates, polysilolxanes, polyesters, polyamides, polyester amides, polycarbonates, polypeptides, and cellulose. Above all, from the standpoint of compatibility with the nematic liquid crystalline polymer serving as the base, mainly aromatic, optically active polyesters are most preferred. Examples are the following polymers:

Polymer consisting essentially of the following structural units:

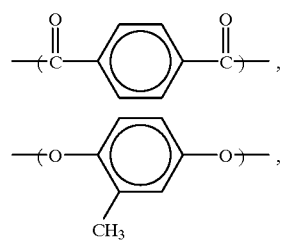

Polymer consisting essentially of the following structural units:

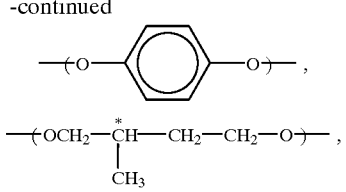

Polymer consisting essentially of the following structural units:

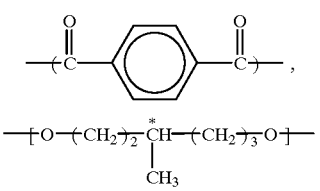

-continued

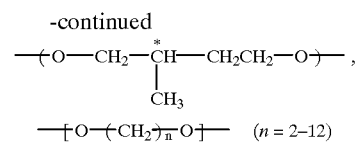

Polymer consisting essentially of the following structural units:

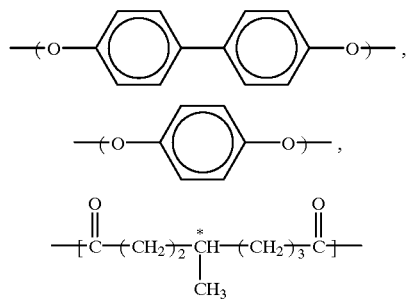

Polymer consisting essentially of the following structural units:

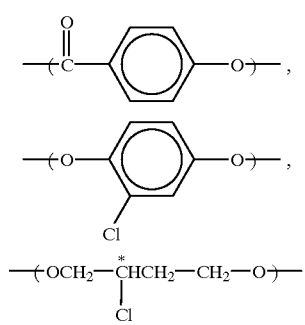

Polymer consisting essentially of the following structural units:

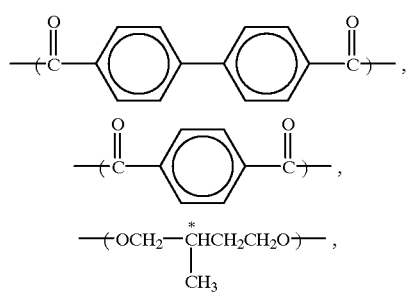

Polymer consisting essentially of the following structureal units:.

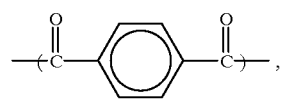

-continued

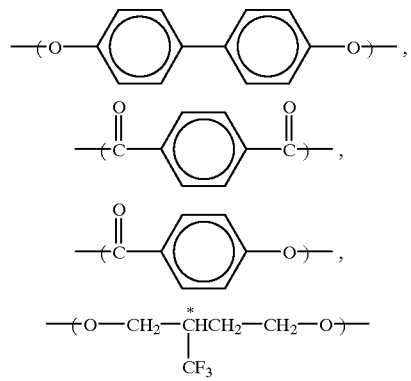

Polymer consisting essentially of the following structural units:

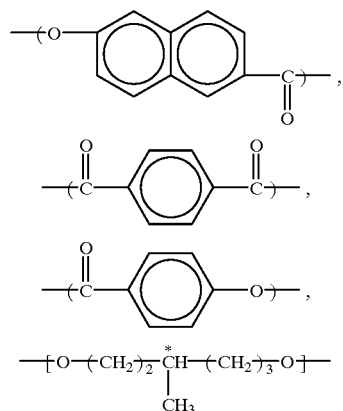

Polymer consisting essentially of the following structural units:

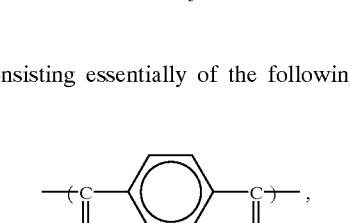

Polymer consisting essentially of the following structural units:

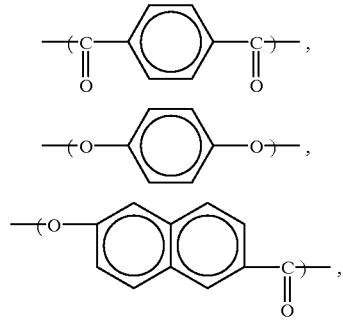

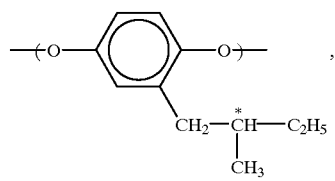

Polymer consisting essentially of the following structural units:

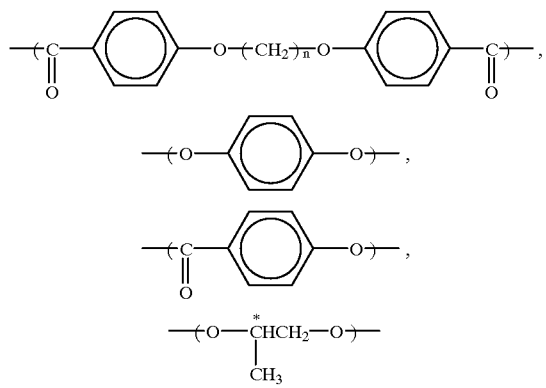

Polymer consisting essentially of the following structural units:

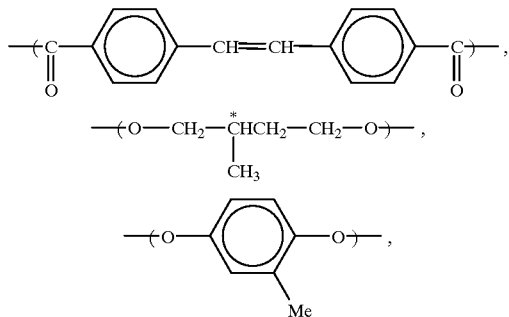

In each of these polymers, the proportion of the unit having an optically active group is usually in the range of 0.5 to 80 mole %, preferably 5 to 60 mole %.

These polymers preferably range in molecular weight from 0.05 to 5.0 in terms of inherent viscosity as determined at 30° C. in phenol/tetrachloroethane for example. An inherent viscosity larger than 5.0 is not desirable because of too high viscosity which eventually causes deterioration of orientatability. An inherent viscosity smaller than 0.05 is not desirable, either, because it becomes difficult to control the composition.

However, a lower molecular weight will do if it can be made into a high molecular weight by crosslinking for example after fixing of the orientation.

The optical element of the present invention can also be prepared by using a liquid crystalline polymer which provides a uniform, twisted nematic orientation of monodomain for itself without using any other optically active compound and which permits the state of such orientation to be immobilized easily. It is essential that the polymer in question have an optically active group in the molecule and be optically active. Examples are main chain type liquid crystalline polymers such as polyesters, polyamides, polycarbonates and polyester imides, as well as side chain type liquid crystalline polymers such as polyacrylates, polymethacrylates and polysiloxanes. Polyesters are particularly preferred in point of easiness of preparation, superior orientatability and high glass transition temperature. Most preferred polyesters are those which contain ortho-substituted aromatic units as constituents. But also employable are polymers which, in place of such ortho-substituted aromatic units, contain as constituents bulky substituent-containing aromatic units or aromatic units having fluorine or fluorine-containing substituent groups. These optically active polyesters can be obtained by introducing in the nematic liquid crystalline polyesters so far explained such optically active groups as shown below using diols, dicarboxylic acids and hydroxycarboxylic acids (the * mark in the following formulae represents an optically active carbon):

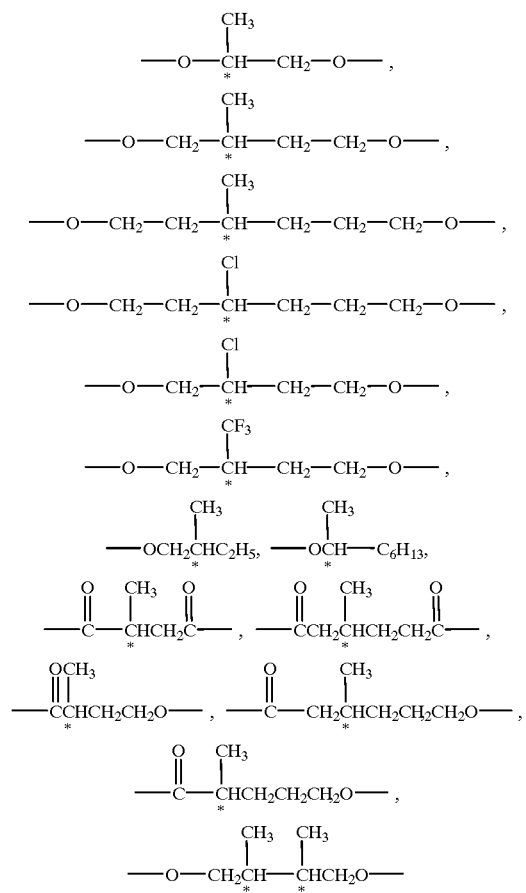

The molecular weights of these polymers are in the range of preferably 0.05 to 3.0, more preferably 0.07 to 2.0, in terms of intrinsic viscosity as determined at 30° C. in, for example, a mixed phenol/tetrachloroethane (60/40) solvent. A smaller intrinsic viscosity than 0.05 is not desirable because the strength of the resulting liquid crystalline polymer will be low, while if the intrinsic viscosity is larger than 3.0, there will arise problems such as the deterioration of orientability and an increase of the time required for orientation because of too high viscosity during the formation of liquid crystal.

However, a lower molecular weight will do if it can be made into a high molecular weight by crosslinking for example after fixing of the orientation.

These polymers can be prepared by the foregoing melt polycondensation process or acid chloride process.

The following are typical examples of the liquid crystalline polymer used in the present invention described above.

Polymers represented by:

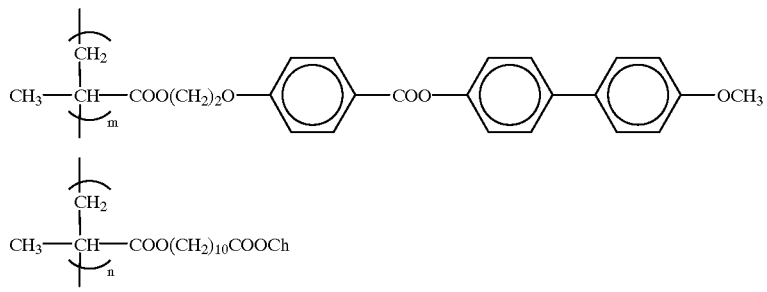

Ch: cholesteryl m/n=usually 99.9/0.1 to 70/30, preferably 99.5/0.5 to 80/20, more preferably 99/1 to 90/10

Polymers represented by:

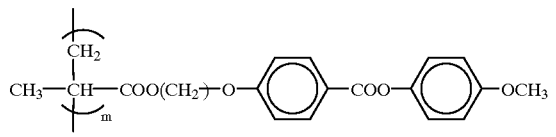

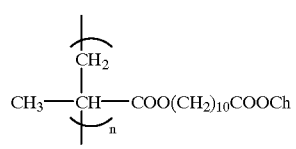

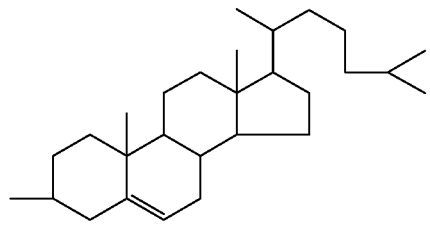

m/n=usually 99.9/0.1 to 70/30, preferably 99.5/0.5 to 80/20, more preferably 99/1 to 90/10

Polymers represented by:

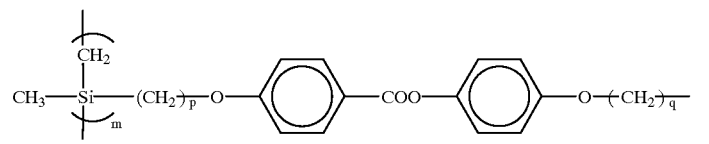

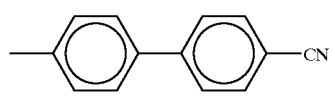

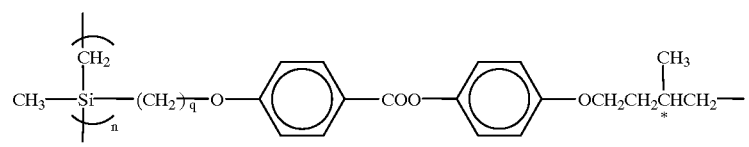

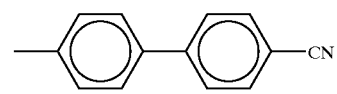

m/n=usually 99.9/0.1 to 70/30, preferably 99.5/0.5 to 90/10, more preferably 99/1 to 95/5 p, q: integer of 2 to 20

Polymers represented by:

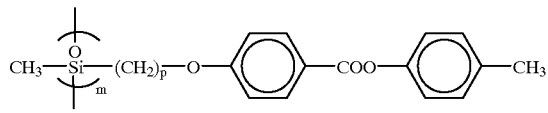

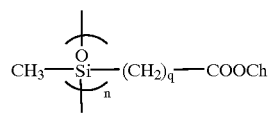

m/n=usually 99.9/0.1 to 70/30, preferably 99.5/0.5 to 90/10, more preferably 99/1 to 95/5 p, q: integer of 2 to 20

Polymers presented by:

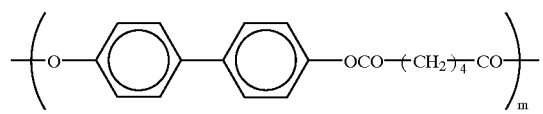

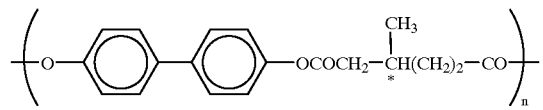

m/n=usually 99.9/0.1 to 60/40, preferably 99.5/0.5 to 80/20, more preferably 99/1 to 90/10

Polymers represented by:

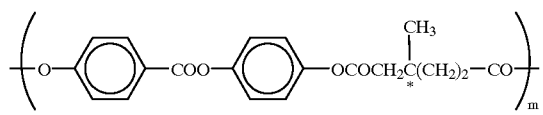

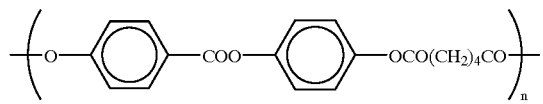

m/n=0.5/9.5 to 70/30, preferably 1/99 to 10/90

Polymers represented by:

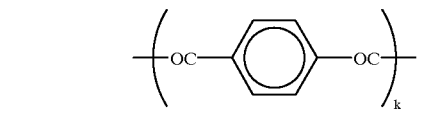

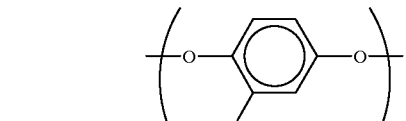

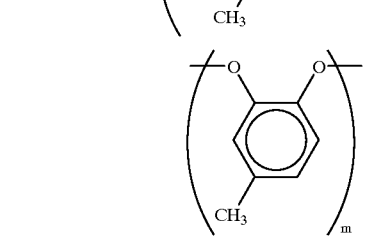

-continued

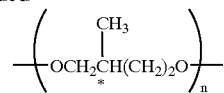

k=l+m+n k/n=99.5/0.5 to 60/40, preferably 99/1 to 70/30 l/m=5/95 to 80/20

Polymers represented by:

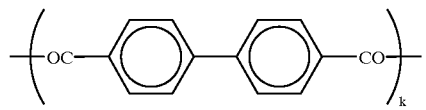

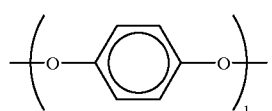

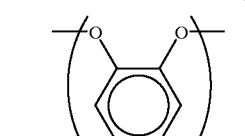

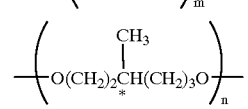

k=l+m+n k/n=99.5/0.5 to 60/40, preferably 90/1 to 70/30 l/m=5/95 to 80/20

Polymers mixtures represented by:

(A)

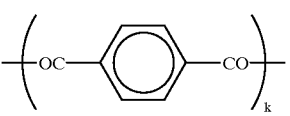

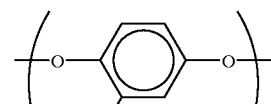

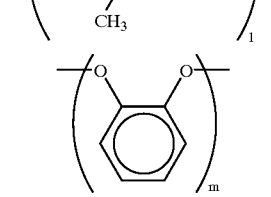

(B)

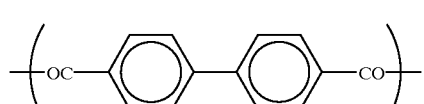

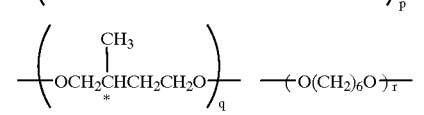

(A)/(B)=usually 99.9/0.1 to 50/50 (weight ratio), preferably 99.5/0.5 to 70/30, more preferably 99/1 to 80/20 k=l+m l/m=75/25 to 25/75
p=q+r
r/q=80/20 to 20/80

Polymer mixtures represented by:

(A)
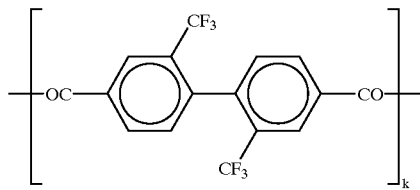
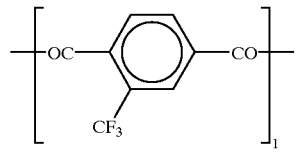
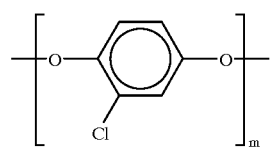

(B) cholesteryl benzoate (A)/(B)=usually 99.9/0.1 to 50/50 (weight ratio), preferably 99.5/0.5 to 70/30, more preferably 99/1 to 80/20 m=k+l k/l=80/20 to 20/80

Polymer mixtures represented by:

(A)
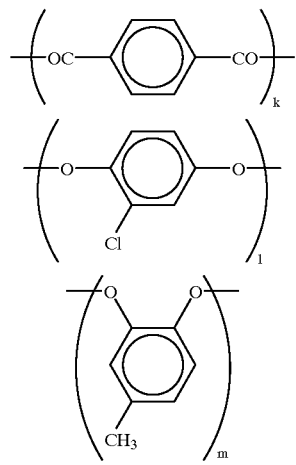

(B)
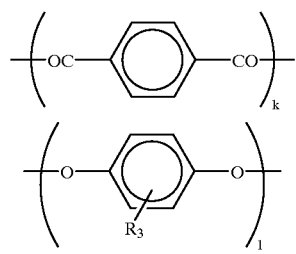

-continued
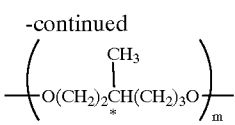

(A)/(B)=usually 99.5/0.1 to 60/40 (weight ratio), preferably 99.5/0.5 to 70/30, more preferably 99/1 to 80/20 k=l+m l/m=25/75 to 75/25 p=q+r p/r=20/80 to 80/20

The mark * represents an optically active carbon.

How to form a long film having the above liquid crystalline polymer in an oriented state will be described below.

The liquid crystalline polymer can be oriented in a desired direction by a rubbing treatment, which treatment is performed in a direction having a predetermined angle relative to the MD direction of a long orienting substrate.

The orienting substrate is for controlling the orientation of the liquid crystalline polymer and it may be a polymer film formed on a suitable substrate.

As a constituent polymer of the orienting substrate there may be used any polymer if only it permits physical or physicochemical rubbing treatment for the surface and permits the liquid crystalline polymer subsequently contacted with the rubbed surface to be oriented in conformity with the rubbed direction. Any of thermosetting resins and thermoplastic resins may be used.

As examples there are mentioned such thermosetting resins as polyimides, epoxy resins and phenolic resins, as well as such thermoplastic resins as polyamides, e.g. nylon, polyether-imides, polyether ketones, polyether ether ketones (PEEK), polyketones, polyether sulfones, polyphenylene sulfides, polyphenylene oxides, polyesters, e.g. polyethylene terephthalate and polybutylene terephthalate, polyacetals, polycarbonates, poly(meth)acrylates, cellulosic resins, e.g. triacetyl cellulose, and polyvinyl alcohols.

The foregoing polymer film per se may be subjected to a rubbing treatment. Alternatively, the polymer film may be used as a substrate and on the surface thereof may be formed an organic thin film using such another polymer exemplified above. As the substrate for the said organic thin film there also may be used a metallic foil such as copper, stainless steel or steel foil in addition to the above polymer film.

The orienting substrate itself may be a metallic foil such as copper, stainless steel or steel foil.

As the method for forming the organic thin film as an orienting substrate on the base there can be adopted an inexpensive method such as, for example, the use of a die coater because the substrate is a long continuous film. For example, there may be adopted a method wherein a solution of a thermosetting resin, e.g. polyimide, is coated on the substrate and thereafter cured by heating to obtain an organic thin film, or a method wherein a solution of a thermoplastic resin, e.g. polyvinyl alcohol, is coated on the substrate, followed by the removal of solvent, to obtain an organic thin film.

As examples of the constituent polymer of the organic thin film as an orienting substrate which undergoes a rubbing treatment, particularly preferred are such thermosetting resins as polyimides and such thermoplastic resins as polyethylene terephthalate, polyphenylene sulfides, PEEK and polyvinyl alcohols. Since these resins are high in heat resistance, the orientation after the rubbing treatment is maintained stably even during heating of the liquid crystalline polymer for fixing the liquid crystal phase which will be described later.

Particularly preferred as an object to be rubbing-treated in the present invention is a long, self-supporting polymer film without lamination of any supporting material or the like. Examples are, out of those exemplified above, films of thermoplastic resins such as films of polyethylene terephthalate, polyphenylene sulfides, PEEK and polyvinyl alcohols.

Such films can be obtained as long, continuous films easily by a conventional molding method, e.g. T-die extrusion. A suitable film thickness can be adopted, for example in the range of 10 μm to 10 mm. Also as to the film width, a suitable width can be adopted, but usually in the range of 1 to 500 cm.

The thermoplastic resin films in question may be stretched uniaxially or biaxially with respect to the MD direction suitably by a known method as long as the rubbing treatment which will be described below is not affected.

The rubbing treatment is applied at a predetermined certain angle, preferably obliquely, relative to the MD direction of a long, continuous film.

An oblique angle to the MD direction is set separately so as to be in correspondence to a predetermined orientation angle of liquid crystal molecules in, say, a liquid crystal display. For example, it can be set at 45° or more relative to the MD direction.

The rubbing treatment may be performed by any suitable method. According to one method, a long, continuous film (12) is put on a stage (11) which is for conveying the film in the MD direction, and a rubbing roll (10) is also put on the stage (11) obliquely at a suitable angle relative to the MD direction of the film. Then, the rubbin roll (10) is rotated under conveyance of the long film (12) to rub the film surface. In this construction, the angle between the rubbing roll (10) and the film (12) can be adjusted freely.

To the surface of the rubbing roll is adhered a suitable rubbing material, which is selected according to the kind of the orienting substrate to be subjected to the rubbing treatment. Examples are woven cloth, felt, rubber and brush, with no special limitation being placed thereon. Usually, such woven cloth as nylon and cotton cloths are used. In the case where the orienting substrate itself is a metallc foil, there also may be used such a rubbing material as sand paper or leather.

In the rubbing treatment it is important that the orienting substrate surface be rubbed in a certain direction while taking the hardness of the same surface into account. From such a viewpoint, the rubbing pressure and the revolutions of the rubbing roll are set at appropriate values. Usually, the orienting substrate is moved at a speed of 0.5 to 100 m/min, preferably 1 to 30 m/min, and suitable revolutions of the rubbing roll is selected in the range of 1 to 1,000, preferably 5 to 200, in terms of a peripheral speed ratio. A suitable rubbing pressure is to the extent that the rubbing material comes into slight contact with the substrate surface. In the case where the rubbing material is cloth, the rubbing pressure may be set at a level at which the fiber tips are pushed into a degree of 100 to 5,000 μm, preferably 100 to 2,000 μm.

The orienting substrate which has thus been subjected to the rubbing treatment is then laminated so that the rubbed surface comes into contact with the liquid crystalline polymer, whereby the liquid crystalline polymer is oriented according to the rubbed state of the substrate.

The liquid crystalline polymer is formed into a long film by a suitable method, for example by a method wherein the polymer is dissolved in a suitable solvent and the resulting solution is applied to the substrate and then dried to form a film, or by a method wherein the liquid crystalline polymer is directly melt-extruded using T-die. In point of quality, including film thickness, the former method involving the application of solution and drying is suitable. As explained above, the "long film" as referred to herein means a continuous film having a certain length, and industrially it means a continuous film capable of being fed in a rolled state. Of course, the rolled form is not an essential condition. The film may be a suitably folded, continuous film, As the case may be, the length of the long film reaches 10,000 m.

More specifically, the liquid crystalline polymer is dissoved in a solvent at a predetermined ratio to prepare a solution. The solvent to be used differs depending on the kind of the polymer used, but usually there may be employed any of ketones such as acetone, methyl ethyl ketone and cyclohexanone, ethers such as tetrahydrofuran and dioxiane, halogenated hydrocarbons such as chloroform, dichlioroethane, teterachloroethane, trichloroethylene, tetrachloroethylene and o-dichlorobenzene, mixed solvents thereof, mixed solvents thereof with phenol, amide solvents such as dimethylformamide and dimethylacetamide, as well as such solvents as dimethyl sulfoxide and N-methylpyrrolidone. The concentration of the solution differs depending on the viscosity of the polymer used, but usually it is in the range of 5 to 50 wt %, preferably 10 to 30 wt %.

Next, the solution is applied to a long, orienting substrate which has been rubbed obliquely at a predetermined angle relative to the MD direction.

How to apply the solution to the substrate is not specially limited. For example, there may be adopted slide die coating method, slot die coating method, curtain die coating method, roll coating method, bar coating method, or dipping method. After this coating operation, the solvent is removed by drying.

After a layer of the liquid crystalline polymer was formed on the long, orienting substrate which had been rubbed in the manner mentioned above, heating is performed at a predetermined temperature for a predetermined period of time, followed by cooling, to fix the orientation of the liquid crystalline polymer.

In the orienting operation, the lower the polymer viscosity, the better the orientation, because during melting of the polymer the low viscosity assists the orientation based on an interface effect. In other words, the higher the heating temperature, the better the orientation. However, a too high temperature is not desirable because it would cause an increase of cost and deterioration of the operation efficiency. From such a standpoint, the heating temperature is usually selected in the range of 50° to 300° C., preferably 100° to 250° C., and the heat treatment is performed for 10 seconds to 60 minutes, preferably 30 seconds to 30 minutes. A suitable heating means may be adopted such as, for example, hot air heating, infrared ray heating, dielectric heating, heating using an electric heater, or heatig using a hot roll.

Anyhow, it is important that the heat treatment be conducted at a temperature above the glass transition temperature of the liquid crystalline polymer and below the transition point to an isotropic phase and for a period of time sufficient for orientation of the liquid crystal polymer molecules.

The oriented state thus obtained is fixed by subsequent cooling to a temperature below the glass transition temperature of the liquid crystalline polymer. Since glass phase is developed subsequent to the liquid crystal phase, the orientation can be fixed by cooling without affecting the orientation.

The cooling speed is not specially limited. For example, a mere transfer of the heated liquid crystalline polymer from the heating zone into an atmosphere held at a temperature below the glass transition of the polymer permits the orientation to be fixed. Air cooling or refrigerant cooling such as water cooling may be adopted for the purpose of improving the production efficiency.

The thickness of the liquid crystalline polymer film after fixing of the orientation is not specially limited as long as the film functions optically on the basis of a twisted nematic structure. In the application field where visible light is essential, for example in the display use, the film thickness is not smaller than 0.05$\mu$m, preferably not. smaller than 1 $\mu$m, more preferably not smaller than 2 $\mu$m. A smaller film thickness than 0.05 $\mu$m is not desirable because it would become difficult to make an accurate adjustment of the film thickness. Although the upper limit of the film thickness is not specially limited, a too large thickness is not desirable because the function to restrict light as an optical element would be deteriorated. From this viewpoint it is suitable that the film thickness be not larger than 100 $\mu$m, preferably not larger than 30 $\mu$m.

In the present invention, since the orienting substrate which underlies the liquid crystalline polymer film is a long orienting substrate which has been rubbed obliquely at a predetermined angle relative to the MD direction, the polymer film is made long and oriented in accordance with the rubbing treatment conducted under such condition.

Thus, the liquid crystalline polymer film used in the present invention is long and oriented at a predetermined angle in a desired direction, preferably in an oblique direction relative to the MD direction. When the surface and the back of the polymer film are oriented in directions different from each other, it suffices for one side to be oriented obliquely at a predetermined angle relative to the MD direction.

In the case where the liquid crystalline polymer molecules are oriented in a mere nematic structure of monodomain, the surface and the back of the polymer film are not different in the direction of orientation, and rubbed direction and the oriented direction of the liquid crystalline polymer coincide with each other. Therefore, in order to obtain a long, liquid crystalline polymer film oriented obliquely at a predetermined angle relative to the MD direction, it is necessary that the orienting substrate used be rubbed obliquely at the predetermined angle relative to the MD direction.

However, when the liquid crystalline polymer molecule is oriented in a twisted, nematic structure of monodomain, the direction of orientation may be different between the surface and the back of the polymer film. More particularly, the orientation of the liquid crystalline polymer layer on the side which is in contact with the rubbed orienting substrate is in the same direction as the rubbed direction of the substrate. But the direction of orientation on the opposite side is different by an angle which is determined by both the thickness of the polymer layer and the content of optically active units, and consequently it is sometimes not coincident with the rubbed direction of the orienting substrate.

For this reason, in the case of a liquid crystalline polymer which exhibits a twisted, nematic orientation of monodomain, it is not always necessary that the rubbed direction of the orienting substrate be oblique relative to the MD direction. For example, there may be used an orienting substrate which has been rubbed in parallel with the MD direction.

When the long orienting substrate which has been rubbed obliquely at a predetermined angle relative to the MD direction is a light transmitting substrate, the laminate with fixed orientation may be used as an optical element as it is or in combination with a polarizing sheet. Further, the liquid crystalline polymer layer with fixed orientation may be transferred onto a suitable, light transmitting substrate serving at a support, for eventual use as an optical element.

The light transmitting substrate is not specially limited if only it has transparency and optical isotropy and can support the liquid cystralline polymer layer. But in view of the requirement that it should be long, a plastic film is suitable. Examples are films of polymethyl methacrylate, polystyrene, polycarbonate, polyether sulfone, polylphenylene sulfide, polyarylate, polyethylene sulfide, amorphous polyolefin and triacetyl cellulose. The thickness of the light transmitting substrate is not specially limited, but is usually selected in the range of 1 to 50$\mu$m.

The transfer of the liquid crystalline polymer layer to the light transmitting substrate can be done by any suitable method, for example by a transfer method wherein the polymer layer is adhered to the substrate using a suitable, adhesive or pressure-sensitive adhesive and is thereby transferred thereto. The adhesive or pressure-sensitive adhesive is not specially limited if only it has a light transmitting property and is optically isotropic. Examples are acrylic, epoxy, ethylene-vinyl. acetate and rubber adhesives and self-adhesives, with acrylic adhesive and pressure-sensitive adhesive being preferred.

The long laminate film thus obtained is oriented at a predetermined certain angle, preferably obliquely, relative to the MD direction.

For surface protection of the liquid crystalline polymer layer, a protective layer formed of a curable acrylic resin may be provided on one side of the polymer layer, or a light transmitting film serving as a protective film may be laminated to one side of the polymer layer through an adhesive or pressure-sensitive adhesive layer.

If the orientation-fixed, liquid crystalline film is protected with a protective film, the liquid crystalline film can be wound up in the form of a roll. Of course, if the liquid crystalline film itself is tough and need not be protected its surface, the orientation-fixed, liquid crystalline film can be rolled without forming a protective layer thereon.

In the present invention, the laminate thus obtained is further affixed with a long polarizing sheet. As such polarizing sheet there may be used a known polarizing film, which is a uniaxially stretched polymer film. For example, the polarizing film is made of a uniaxially stretched, long and transparent film of polyvinyl alcohol, polyvinyl butyral or polyester such as PET which film is impregnated with iodine or a dichroic dye. A suitable thickness thereof is selected in the range of 1 to 500 μm.

The polarizing sheet is usually available commercially as a laminate sheet of a three-layer structure comprising light transmitting substrate/polarizing film/light transmitting substrate which are laminated through an adhesive or pressure-sensitive adhesive layer, so such laminate sheet may be utilized. As to the kind, etc. of the said light transmitting substrate, they are the same as those mentioned above.

Also in laminating the polarizing film and the liquid crystalline polymer film to each other, a known, light transmitting, adhesives or pressure-sensitive adhesives may be interposed therebetween.

In the case where the light transmitting substrate explained above has a polarizing function, that is, when it also serves as a polarizing film, the liquid crystalline polymer may be transferred directly onto such polarizing and light transmitting substrate. In this case., the liquid crystalline polymer and the polarizing sheet are laminated in direct contact with each other, with the result that the weight of the laminate sheet for use as an optical element is reduced and the distance between the liquid crystal line polymer layer and the polarizing layer becomes minimum. Accordingly, it is expected that the viewing angle of a liquid crystal display using the laminate sheet will be further compensated.

Since the liquid crystalline polymer layer used in the present invention is a long, continuous film, it is possible to effect the lamination thereof with a long and continuous polarizing sheet easily in a continuous manner. In this case, it is necessary to perform the lamination so as to attain a predetermined certain relation between the transmission axis of the polarizing film and the optical axis of the liquid crystalline polymer film. Since the orientation angle of the liquid crystalline polymer used in the invention can be set in a desired direction, the lamination can be effected by arranging both long films in the MD direction and putting one on the other continuously. That is the conventional operation of taking a directional and angular coincidence between film pieces which have been cut beforehand in square form and thereafter laminating them together, is no longer necessary. Consequently, both productivity and economy are improved.

To be more specific, while an end of the liquid crystalline polymer film once wound up in a roll form and an end of a rolled polarizing film (industrially the polarizing film is generally supplied in a rolled form from a polarizing sheet manufacturer) are delivered continuously, both films can be laminated together under mutual registration in the longitudinal direction. Thus, it becomes possible to effect a continuous operation. Besides, the oblique orientation in the MD direction permits reduction in the proportion of waste residue as mentioned previously. In a certain process it is also possible to laminate an obliquely oriented long film after continuous production as it is to the polarizing sheet without once winding it up in a roll form. Also in this case, however, at least the polarizing film should be delivered from a roll because in many cases it is supplied in a roll form. By so doing, it becomes possible to effect a continuous operation. (Not only in the case where both liquid crystalline film and polarizing film are rolled, but also in such a case as just mentioned above), the film supply mode is sometimes called "roll to roll" herein.

Concrete examples of the laminate sheet for an optical element according to the present invention are sheets having an optical function and having the constructions of hard coating layer/liquid crystalline polymer layer/adhesive or pressure-sensitive adhesive layer/light transmitting substrate layer, light transmitting protective film/adhesive or pressure-sensitive adhesive layer/liquid crystalline polymer layer/adhesive or pressure-sensitive adhesive layer/light transmitting substrate layer, and (releasable protective film)/liquid crystalline polymer layer/adhesive or pressure-sensitive adhesive layer/light transmitting substrate layer, with a polarizing sheet laminated to either the upper or the lower surface of each of the sheets. The polarizing sheet may be of the foregoing three-layer structure or of a two-layer structure of polarizing film/light transmitting substrate adhered together through an adhesive or pressure-sensitive.

Also employable are laminate sheet constructions obtained by replacing the light transmitting substrates in the above-exemplified constructions with polarizing sheets, namely hard coating layer/liquid crystalline polymer layer/adhesive or pressure-sensitive adhesive layer/polarizing sheet light transmitting protective film/adhesive or pressure-sensitive adhesive layer/liquid crystalline polymer layer/adhesive or pressure-sensitive adhesive layer/polarizing sheet, and (releasable protective film)/liquid crystalline polymer layer/adhesive or pressure-sensitive adhesive layer/polarizing sheet.

Further, there may be adopted the laminate sheet constructions of hard coating layer/liquid crystalline polymer layer/adhesive or pressure-sensitive adhesive layer/polarizing film layer/adhesive or pressure-sensitive adhesive layer/light transmitting substrate, light transmitting protective film layer/adhesive or pressure-sensitive adhesive layer/liquid crystalline polymer layer/adhesive or pressure-sensitive adhesive layer/polarizing film/adhesive or pressure-sensitive adhesive layer/light transmitting substrate, and (releasable protective film)/liquid crystalline polymer layer/adhesive or pressure-sensitive adhesive layer/polarizing film/adhesive or pressure-sensitive adhesive layer/light transmitting substrate.

In all of the above laminate sheet constructions, a suitable thickness of each adhesive or pressure-sensitive adhesive layer is usually selected in the range of 1 to 100 μm.

A releasable protective film having an adhesive force may be laminated to the outer surface of the long laminate sheet according to the present invention to protect the sheet against scratch and stain. Since this protective film is used temporarily, it is not always required to be light-transmissible, but for permitting optical tests or the like to be conducted through the protective film, the film is light-transmissible and optically isotropic.

The long laminate sheet for an optical element according to the present invention is utilized in a suitably cut form. For example, each cut sheet is laminated as an optical element to a panel for a liquid crystal display.

The laminate sheet for an optical element, an optical element using the same, as well as how to produce them, will be described below concretely.

The liquid crystalline polymer layer which has been formed and fixed on the orienting substrate is transferred onto the foregoing light transmitting substrate to afford a laminate sheet of liquid crystalline polymer layer/light transmitting substrate.

The transfer to the light transmitting substrate can be done by a suitable method, for example a transfer method wherein a layer of an adhesive or pressure-sensitive adhesive if formed on either the liquid crystalline polymer layer side or the light transmitting substrate side and the other side is adhered thereto to effect transfer. As the adhesive or pressure-sensitive adhesive there may be used any adhesive or pressure-sensitive adhesive if only it is light-transmissible and has an optical isotropy. Examples are acrylic, epoxy, ethylene-vinyl acetate and rubber adhesive and pressure-sensitive adhesives.

The substrate to which the liquid crystalline polymer layer is to be transferred is light-transmissible, so by laminating the light transmitting substrate to the polymer layer through a photocurable acrylic resin adhesive, then radiating light from the outside of the light transmitting substrate to let the adhesive to cure and subsequent separating the polymer layer from the orienting substrate, the transfer can be done easily. A suitable thickness of the cured acrylic resin layer is selected in the range of 0.05 to 50 $\mu$m. A light transmittance of not lower than 85%, preferably not lower than 90%, is necessary.

The cured acrylic resin layer as an adhesive layer is formed by the application of a curable acrylic oligomer or monomer and subsequent curing.

As a curable acrylate there may be used one which is known as a photocurable acrylic adhesive. As examples there are mentioned various acrylic oligomers and monomers, including polyester acrylates, epoxy acrylates, urethane acrylates, polyether acrylates and silicone acrylates, as well as mixtures thereof, and mixtures thereof with various reactive diluents.

How to cure such curable arylic resins is not specially limited. For example, there may be adopted any of heat-curing, cold curing in a redox system, anaerobic curing, and curing by actinic radiation such as ultraviolet rays or electron beam. Particularly, the use of actinic radiation such as ultraviolet rays or electron beam is preferred. The photo-curing method is preferred because it generates no or little heat and hence the orientation of the liquid crystalline polymer which has been fixed is little influenced.

As examples of thermal radical polymerization initiators employable in the invention there are mentioned diacyl peroxides such as benzoyl peroxide and lauroyl peroxide, ketone peroxides, peroxyketals, dialkyl peorxides, peroxyesters and azobis compounds such as azobisisobutyronitrile and azobisisovaleronitrile. The amount of the initiator to be used may be in the range of 0.1 to 10 wt % based on the weight of the resin.

As examples of a photocuring initiator to be used in the case of curing the adhesive with actinic radiation, there are mentioned benzoin ether, benzoin ethyl ether, benzyl methyl ketal, hydroxyphenyl ketone, 1,1-dichloroacetophenone, thioxanthones, and benzophenones in combination with amines. The amount thereof may be in the range of 0.1 to 10 wt % of the resin.

A preferred mode of the laminated sheet thus obtained is a long laminate sheet comprising a laminate of the liquid crystalline polymer and the light transmitting substrate. Since it is oriented obliquely relative to the MD direction, high economic merit and productivity are attained.

According to the present invention, a protective layer is formed on the liquid crystalline polymer layer to protect the surface of the polymer layer. The protective layer may be a cured acrylic resin layer formed of a curable acrylate having optical isotropy, or may also be constituted by the bonding of a light transmitting film through a curable acrylic resin as an adhesive. In both cases, the cured acrylic resin layer is formed by applying a curable acrylic oligomer or monomer to the surface of the polymer layer followed by curing.

As the curable acrylate there may used one which is known as an acrylic adhesive, a curable plastic coating agent or a hard coating agent for plastics. Examples are various acrylic oligomers and monomers, including polyester acrylates, epoxy acrylates, urethane acrylates, polyether acrylates and silicone acrylates, as well as mixtures thereof, and mixtures thereof with various reactive diluents.

No special limitation is placed on the method for curing the curable acrylic resin used. For example, there may be adopted heat-curing, cold curing in a redox system, anaerobic curing, or curing by actinic radiation such as ultraviolet rays or electron beam. A preferred curing method is a photocuring method using actinic radiation such as ultraviolet rays or electron beam. This is because the photocuring method generates no or little heat and hence the orientation of the liquid crytalline polymer which has been fixed is little influenced.

As a thermal radical polymerization initiator there may be used, for example, any of diacyl peroxides such as benzoyl peroxide and lauroyl peroxide, ketone peroxides, peroxyketals, dialkyl peroxides, peroxyesters and azobis compounds such as azobisisobutyronitrile and azobisisovaleronitrile. The amount of the initiator to be used may be in the range of 0.1 to 10 wt % based on the weight of the resin.

In the case of curing the adhesive with actinic radiation, there may be used a photocuring initiator, which is exemplified by benzoin ether, benzoin ethyl ether, benzyl methyl ketal, hydroxyphenyl ketone, 1,1-dichloroacetophenone, thioxanthones, and benzophenones in combination with amines. Its amount may be in the range of 0.1 to 10 wt % of the resin.

The hardness of the cured acrylic resin layer is preferably not lower than 2B in terms of pencil hardness in the case of using the same layer per se as a surface protecting layer. Of course, where the cured acrylic resin layer is a cured adhesive layer as will be described later, no special hardness is needed because the protection of the liquid crystalline polymer layer is taken charge of by the foregoing light transmitting film to be bonded to the polymer layer. Further, a light transmittance of not lower than 85%, preferably not lower than 90%, is necessary. A suitable thickness of the photocured acrylic resin layer is in the range of 0.1 to 200 µm, preferably 0.5 to 50 µm.

By the method described above there is produced a laminate sheet for an optical element in which cured acrylic resin layer having optical isotropy/oriented liquid crystalline polymer layer/adhesive or pressure-sensitive adhesive layer/ light transmitting substrate layer are laminated in this order.

If necessary, an optically isotropic, light transmitting protective film may be laminated to the surface of the cured acrylic resin layer for the purpose of surface protection, whereby the surface protecting function can be enhanced. In this case, out of the foregoing curable acrylic resins, a photocurable resin may be selected, and after lamination thereto of the aforesaid light transmitting protective film, may be cured by the radiation of light from the outside.

As the material of the above light transmitting protective film, a suitable material is selected from among those explained previously in connect ion with the light transmitting substrate. It is necessary that the light transmitting protective film have a light transmittance of not lower than 85%, preferably not lower than 90%. Its thickness is in the range of 0.1 to 500 µm, preferably 1 to 200 µm.

The optical element obtained according to the present invention and having a laminate structure of cured acrylic resin layer having optical isotropy/oriented liquid crystalline polymer layer/adhesive or pressure-sensitive adhesive layer/ light transmitting substrate layer which are laminated in this order, has a light transmittance of preferably not lower than 80%, more preferably not lower than 85%.

A temporary protective film having adherence is often affixed to the surface of an optical element as product for protection of the surface and is removed before use, for example when the optical element is adhered to a liquid crystal display or the like. Also in the present invention, such a type of protective film may be used as necessary.

When the laminate sheet of the invention is to be used as a color compensator for a liquid crystal display, it is further laminated to a polarizing sheet. Even in this case; since the laminate sheet is in the form of a long, continuous film, it is possible to effect lamination thereof with a polarizing sheet which is also long and continuous, easily in a continuous manner. It is necessary that the lamination with such a polarizing sheet be done so as to attain a predetermined certain relation between the transmission axis of the polarizing film and the orientation direction of the liquid crystalline polymer film. On this regard, since the angle of orientation of the liquid crystalline polymer layer used in the present invention can be set at any desired angle, it is possible to effect continuous lamination easily.

To be more specific, while an end of the liquid crystalline polymer film once wound up in a roll form and an end of a rolled polarizing film (industrially the polarizing film is generally supplied in a rolled form from a polarizing sheet manufacturer) are delivered continuously, both films can be laminated together under mutual registration in the longitudinal direction. Thus, it becomes possible to effect a continuous operation. Besides, the oblique orientation in the MD direction permits reduction in the proportion of waste residue as mentioned previously. In a certain process it is also possible to laminate an obliquely oriented long film after continuous production as it is to the polarizing sheet without once winding it up in a roll form. Also in this case, however, at least the polarizing film should be delivered from a roll because in many cases it is supplied in a roll form. By so doing, it becomes possible to effect a continuous operation. (Not only in the case where both liquid crystalline film and polarizing film are rolled, but also in such a case as just mentioned above), the film supply mode is sometimes called "roll to roll" herein.

As the polarizing sheet there may be used a known polarizing film. For example, there may be used a long, uniaxially stretched, transparent film of a polymer such as polyvinyl alcohol or polyvinyl butyral, with iodine or a dichroic dye impregnated therein. As the polarizing film there may be used a polarizing film of a three-layer structure in which a polarizing film is sandwiched in between suitable light transmitting substrates like that mentioned previously.

Also in the lamination of the polarizing film and the liquid crystalline polymer film, a known, light transmitting, adhesive or pressure-sensitive adhesive may be interposed therebetween.

More specifically, a polarizing sheet is affixed through an adhesive or pressure-sensitive adhesive to one or both of the upper and lower surfaces of a laminate sheet comprising cured acrylic resin layer having optical isotropy/ oriented liquid crystalline polymer layer/adhesive or pressure-sensitive adhesive layer/light transmitting substrate layer which are laminated in this order or of a laminate sheet comprising light transmitting protective film/cured acrylic resin layer/oriented liquid crystalline polymer layer/ adhesive or pressure-sensitive adhesive layer/light transmitting substrate layer which are laminated in this order. A suitable thickness of the adhesive or pressure-sensitive adhesive layer is selected in the range of 1 to 100 µm.

After a polarizing sheet or the like has been affixed to the long laminate sheet of the invention while matching orientation, the laminate sheet is cut and then affixed to a liquid crystal display for example, thus functioning as an optical element.

EFFECTS OF THE INVENTION

1) Since a long, liquid crystalline polymer film can be produced continuously, both productivity and economy.-are improved.

2) Since the angle of orientation of the liquid crystalline polymer can be controlled as desired, the polymer film pieces can be cut out without waste at the time of assembling an optical element, whereby both economy and yield are improved.

Further, in the case where a polarizing film is to be laminated and affixed to the laminate sheet of the invention, the orientation of the liquid crystalline polymer can be set at a specific angle relative to the optical axis of the polarizing film, so it is possible to laminate the two continuously.

In a certain process it is also possible to laminate an obliquely oriented long film after continuous production as it is to the polarizing sheet without once winding it up in a roll form. Also in this case, however, at least the polarizing film should be delivered from a roll because in many cases it is supplied in a roll form. By so doing, it becomes possible to effect a continuous operation. (Not only in the case where both liquid crystalline film and polarizing film are rolled, but also in such a case as just mentioned above), the film supply mode is sometimes called "roll to roll" herein.

3) The orientation angle of the liquid crystalline polymer film can be set in a wider range than that of a like film oriented by stertching a polymer.

4) Likewise, optical defects are greatly diminished in comparison with a like film oriented by stretching a polymer.

5) Since the liquid crystalline polymer layer is used, it is possible to set orientation in any desired direction. Therefore, a specific direction of orientation can be set relative to the transmission axis of a polarizing film, so that a long liquid crystalline polymer film and a long polarizing film are affixed together continuously, whereby there is obtained a laminate sheet for an optical element which sheet is remarkably improved in both productivity and economy.

6) The liquid crystalline polymer film used in the present invention has a twisted structure, so when this film and a polarizing film are laminated together in the form of rolls, that is, when the long films are put one upon the other while aligning their MD directions, there is obtained a characteristic laminate sheet for an optical element.

More particularly, in the case of a polarizing film which utilizes a uniaxially stretched film, its transmission axis is always fixed in the TD direction relative to the MD direction, so when the rubbing direction for the liquid crystalline polymer film is the MD direction and 90° twisted, if a polarizing film is affixed to the side opposite to the rubbed side, there will be obtained a laminate sheet wherein the light transmission axis and the orientation axis of the liquid crystalline film are aligned with each other. This is one of outstanding features of the present invention.

Since the cured acrylic resin layer is optically isotropic and has a sufficient surface hardness, the resulting optical element can be subjected to optical inspections and can withstand use in a high temperature and high humidity environment. Further, the occurrence of flaw during production or at the time of assembling of the optical element is suppressed.

Moreover, in comparison with the use of a protective film through a self-adhesive, the thickness of the entire optical element and the weight thereof can be reduced, thus leading to the reduction of cost.

In addition, the following characteristics are attained.

1) Since the laminate sheet describe above is a long and continuous film, both productivity and economy are improved.

2) Since the orientation angle of the liquid crystalline polymer layer in the laminate sheet can be controlled as desired, the polymer layer can be cut out without waste at the time of assembling an optical element, whereby both economy and yield are improved.

Further, in the case of laminating the laminate sheet and a polarizing film to each other, the direction of orientation can be set in a specific direction relative to the transmission axis of the polarizing film, so that both can be laminated in a continuous manner.

3) The orientation angle of the liquid crystalline polymer layer can be set in a wider range than in the case of an optical element oriented by stretching a polymer.

4) Similarly, optical defects are greatly diminished in comparison with an optical element oriented by stretching a polymer.

EXAMPLES

The present invention will be described below in detail by way of working examples, in which the following analyzing methods were used.

(1) Twist Angle and Δn·d

Twist angle was measured according to a polarizing analysis method, and Δn·d was determined by analyzing data obtained using an ellipsometer.

(2) Inherent Viscosity

Determined in a mixed phenol/tetrachloroethane (60/40 weight ratio) solvent at 30° C. using a Ubbelohde's viscometer.

(Preparation Example 1 of Liquid Crystalline Polymer Solution)

There was prepared a 20 wt % solution in dimethylformamide of a polymer mixtue (inherent viscosity of a base polymer: 0.21, Tg=60° C., inherent viscosity of an optically active polymer: 0.18) represented by the following formula (1-I):

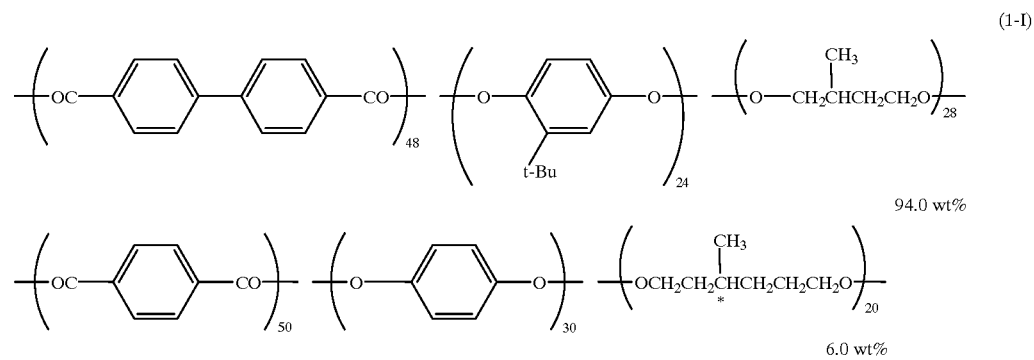

The * mark represents an optically active carbon.

(Preparation Example 2 of Liquid Crystalline Polymer Solution)

There was prepared a 15 wt % solution in phenol/tetrachloroethane (60/40 weight ratio) of a single polymer (inherent viscosity of a base polymer: 0.18 Tg=95° C.) represented by the following formular (1-II):

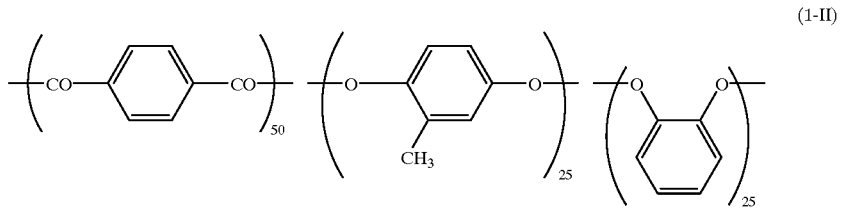

Example 1

The apparatus shown in FIG. 1 was used. While a PEEK film having a width of 50 cm and a thickness of 100 m, serving as an orienting substrate, was moved at a rate of 20 m/min, a rubbing roll having a diameter of 150 mm and with nylon cloth wound thereon was set at 45° relative to the MD direction of the PEEK film and was rotated at 1,500 rpm and at a pushing-in amount of 500 μm of fiber tips of the nylon cloth. In this way rubbing was performed continuously and the rubbed film was taken up onto a roll.

The rubbing angle, which was 45°, is here assumed to be a clockwise angle from the MD direction when the rubbed surface is seen from above.

The liquid crystalline polymer solution prepared in Preparation Example 1 was applied onto the rubbed, long film by means of a roll coater, then dried and subsequently heated at 200° C. for 40 minutes to fix the orientation of the liquid crystalline polymer.

Twist angle and Δn·d of the compensating layer thus obtained were −230° C. and 0.84 μm, respectively.

This film was transferred onto a TAC film using an adhesive in accordance with a conventional adhesion method and then observed through a polarizing microscope. As a result, a dark field appeared at every 180° as an angle of rotation, thus indicating that the orientation was complete. At this time, the direction perpendicular to the light transmission axis of the polarizer was 45° direction relative to the MD direction of the PEEK film.

Next, by using a laminator, the resulting long liquid crystalline polymer/TAC laminate sheet and a commercially available, long polarizing sheet on a roll were arranged in order in the MD direction and laminated together with roll to roll in such a manner that the polarizing sheet was positioned on the liquid crystalline polymer side, using a pressure-sensitive adhesive with roll to roll. The said commercially available polarizing sheet, which is available commercially under the trade name of LLC2-9218 (a product of Sanrittsu (K.K.)), is a long, 50 cm wide laminate sheet of a three-layer structure having a total thickness of 190 μm, and comprising TAC (80 μm)/uniaxially stretched film of PVA (30μm, iodine-impregnated type)/TAC (80 μm) with adjacent layers being bonded using an adhesive.

The resulting long laminate sheet comprises polarizing sheet/pressure-sensitive adhesive layer/liquid crystalline polymer layer/adhesive layer/TAC film. In this laminate sheet, the polymer molecules in the liquid crystalline polymer layer on the polarizing sheet side were oriented at an angle of 45° relative to the transmission axis of the polarizing sheet.

Example 2

The orientation-fixed liquid crystalline polymer prepared in Example 1 was transferred onto a polyethylene terephthalate (PET) film using a pressure-sensitive adhesive in accordance with a conventional method to afford a laminate sheet of liquid crystalline polymer layer/PET.

Then, an ultraviolet curing type acrylic resin layer was formed as a protective layer on the surface of the liquid crystalline polymer layer and thereafter a commercially available, long polarizing sheet was laminated to the protective layer side using a pressure-sensitive adhesive with roll to roll. The commercial polarizing sheet used was the same as that used in Example 1.

As a result, there was obtained a long laminate sheet comprising polarizing sheet/pressure-sensitive adhesive layer/photocured acrylic resin layer/liquid crystalline polymer layer/pressure-sensitive adhesive layer/PET FILM.

In this laminate sheet, the polymer molecules in the liquid crystalline polymer layer on the polarizing sheet side were oriented at an angle of 45° relative to the transmission axis of the polarizing sheet.

Example 3

The orientation-fixed liquid crystalline polymer prepared in Example 1 was transferred onto a TAC film using an adhesive in accordance with a conventional method to afford a laminate sheet of liquid crystalline polymer layer/TAC film.

Then, a TAC film was laminated as a protective layer on the surface of the liquid crystalline polymer layer, using an adhesive, and thereafter a commercially available, long polarizing sheet was laminated to the protective layer side, using a pressure-sensitive adhesive with roll to roll. As the commercial polarizing sheet there was used a polarizing sheet KN-18241T (trade name, a product of Arisawa Seisakusho K.K.) having the same construction and size as those to the commercial polarizing sheet used in Example 1.

As a result, there was obtained a long laminate sheet comprising polarizing sheet/pressure-sensitive adhesive layer/TAC film/adhesive layer/liquid crystalline polymer layer/adhesive layer/TAC film.

In this laminate sheet, the polymer molecules in the liquid crystalline polymer layer on the polarizing sheet side were oriented at an angle of 45° relative to the transmission axis of the polarizing sheet.

Example 4

An orientation-fixed liquid crystalline polymer film obtained in the same way as in Example 1 except that the rubbing direction was set at 5°. was transferred onto a commercially available, long polarizing sheet using an adhesive in accordance with a conventional method of the adhesive. The commercial polarizing sheet used was LLC2-9218 (trade name).

Since the commercial polarizing sheet is in the form of a roll, the long liquid crystalline film was laminated continuously through an adhesive and eventually tansferred onto the commercial polarizing sheet while one end of the rolled polarizing sheet was delivered in a continuous manner. This is also the case in the following Example 5. There was obtained a long laminate sheet of polarizing sheet/adhesive layer/liquid crystalline polymer layer.

In this laminate sheet, the polymer molecules in the liquid crystalline polymer layer on the polarizing sheet side were oriented at an angle of 45° relative to the transmission axis of the polarizing sheet.

Example 5

An orientation-fixed liquid crystalline polymer film was obtained in the same way as in Example 1 except that the rubbing direction was set at 5°. An ultraviolet curing type acrylic resin layer was formed as a protective layer on the surface of the liquid crystalline polymer film. Thereafter, the polymer film with the protective layer was transferred onto a commercially available, long polarizing sheet, LLC2-9218 (trade name), using an adhesive in accordance with a conventional method of the adhesive.

In this case, the polarizing film was delivered continuously from its roll. Then, the liquid crystalline polymer film as a long film and the polarizing film also as a long film were laminated together under mutual registration in the longitudinal direction.

There was obtaind a long laminate sheet of polarizing sheet/self-adhesive layer/acrylic resin layer/liquid crystalline polymer film.

Example 6

A commercially available, long polarizing sheet KN-18241T (trade name), was laminated through a pressure-sensitive adhesive to the TAC film side. (used in the transfer) of the long laminate sheet obtained in Example 3 and having the construction of TAC film/adhesive layer/liquid crystalline polymer layer/adhesive layer/TAC film.

In this case, the polarizing film was delivered continuously from its roll. Then, the liquid crystalline polymer film as a long film and the polarizing film also as a long film were laminated together under mutual registration in the longitudinal direction.

In the resulting laminate sheet, the polymer molecules in the liquid crystalline polymer layer on the polarizing sheet side were oriented at an angle of 85° relative to the transmission axis of the polarizing sheet.

Example 7

Rubbing was performed continuously under the same conditions as in Example 1 except that the rubbing roll was set at an angle of 90° in the MD direction, to afford a PEEK film rubbed in the MD direction.

Then, a liquid crystalline polymer solution was prepared under the same conditions as in Example 1 except that the amount of the optically active polymer used was decreased, and it was applied to the rubbed PEEK film, followed by heating and cooling to fix the orientation, thereby affording an orientation-fixed liquid crystalline polymer film having a twist angle of −225° and Δn·d of 0.84 μm.

The orientation-fixed liquid crystalline film was then transferred onto a commercially available, long polarizing sheet, LLC2-9218 (trade name), using an adhesive in accordance with a conventional method of the adhesive.

In this case, the polarizing film was delivered continuously from its roll and the liquid crystalline polymer film was laminated thereto under mutural registration in the MD direction.

There was obtained a long laminate sheet of polarizing sheet/ adhesive layer/liquid crystalline polymer layer.

In this laminate sheet , the polymer molecules in the liquid crystalline polymer layer on the polarizing sheet side were oriented at an angle of 45° relative to the transmission axis of the polarizing sheet.

Example 8

Rubbing treatment, coating and drying of solution and fixing of orientation were performed in the same way as in Example 1 except that copper foil 20 μm thick was used in place of the PEEK film, that ||1000 sand paper was used instead of nylon as the rubbing cloth and the the rubbing roll was rotated at 150 rpm while keeping the sand paper in slight contact with the copper foil.

As a result, there was obtained a liquid crystalline polymer film which was almost the same as than obtained in Example 1. That is, twist angle and Δn·d of the compensating layer were −230° and of 0.84 μm, respectively.

The film was then transferred onto a TAC film. using an adhesive and observed through a polarizing microscope to find that a dark field appeared at every 180° as an angle of rotation. Thus, it turned out that the orientation was complete. At this time, the direction perpendicular to the light tansmission axis of the polarizer was 45° direction relative to the MD direction of the copper foil.

Next, by means of a laminator, the resulting long liquid crystalline polymer/TAC laminate sheet and a commercially available, long polarizing sheet, LLC2-9218 (trade name, a product of Sanrittsu (K.K.)), were laminated together in such a manner that the polarizing sheet was positioned on the liquid crystalline polymer side, using a pressure-sensitive adhesive: with roll to roll.

The resulting long laminate sheet comprises polarizing sheet/pressure-sensitive adhesive layer/liquid crystalline polymer layer/adhesive layer/TAC film.

In this laminate sheet, the polymer molecules in the liquid crystalline polymer on the polarizing sheet side were oriented at an angle of 45° relative to the transmission axis of the polarizing sheet.

Example 9

In the same way as in Example 1 except that the liquid crystalline polymer solution prepared in Preparation Example 2 was used, the solution was applied using a slot die coater and then dried, followed by heating at 200° C. for 40 minutes and subsequent cooling to fix the orientation of the liquid crystalline polymer.

Twist angle and Δn·d of the compensating layer thus obtained were 0° and 0.42 μm, respectively.

The film was transferred onto a TAC film using an adhesive and observed through a polarizing microscope.

As a result, a dark field appeared at every 180° as an angle of rotation, thus indicating that the orientation was complete. At this time, the direction perpendicular to the light tansmission axis of the polarizer was 45° relative to the MD direction of the PEEK film.

Next, by using a laminator, the resulting long liquid crystalline polymer/TAC laminate sheet and a commercially available, long polarizing sheet, LLC2-9218 (trade name, a product of Sanrittsu (K.K.)), were laminated together in such a manner that the polarizing sheet was located on the liquid crystalline polymer side, using a pressure-sensitive adhesive with roll to roll.

The resulting long laminate sheet comprises polarizing sheet/pressure-sensitive adhesive layer/liquid crystalline polymer layer/adhesive layer/TAC film layer. The polymer molecules in the liquid crystalline polymer layer were oriented at an angle of 45° relative to the transmission axis of the polarizing sheet on both polarizing sheet side and TAC film side.

Example 10

Rubbing was performed continuously under the same conditions as in Example 1 except that the rubbing roll was set at an angle of 90° relative to the MD direction, to afford a PEEK film rubbed in the MD direction. Subsequently, a liquid crystalline polymer solution was prepared under the same conditions as in Example 1 except that the amount of the optically active polymer used was decreased.

The solution was then applied to the rubbed PEEK film using a slot die coater, followed by heating at and cooling to fix the orientation.

As a result, there was obtained an orientation-fixed liquid crystalline polymer film having a twist angle of −90° and Δn·d of 2.1 μm.

The film was then transferred onto a commercially available, long polarizing sheet, LLC2-9218, using an adhesive in accordance with a conventional method. There was obtained a long laminate sheet of polarizing sheet/adhesive layer/liquid crystalline polymer layer.

In this case, the polarizing film was delivered continuously from its roll. Then, the liquid crystalline polymer film as a long film and the polarizing film also as a long film were laminated together under mutual registration in the longitudinal direction.

In this laminate sheet, the polymer molecules in the liquid crystalline polymer layer on the polarizing sheet side were oriented at an angle of 0° relative to the transmission axis of the polarizing sheet.

From this laminated sheet there could be obtained an optical rotator by lamination with roll to roll.

Next, optical elements will be described below by way of working examples.

Preparation Example 2-1 of Liquid Crystalline Polymer Solution)

There was prepared an 18 wt % solution in trichloroethane of an optically active polymer (inherent viscosity: 0.23) represented by the following formula (2-I):

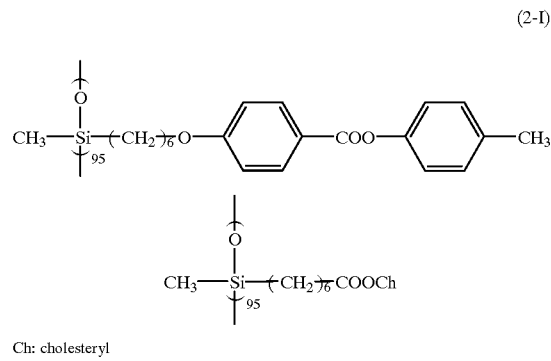

Ch: cholesteryl (Preparation Example 2-2 of Liquid Crystalline Polymer Solution)

There was prepared a 20 wt % solution in dimethylformamide of the polymer mixture (inherent viscosity of a base polymer: 0.21, Tg=60° C., inherent viscosity of an optically active polymer: 0.18) represented by the following formula (2-II):

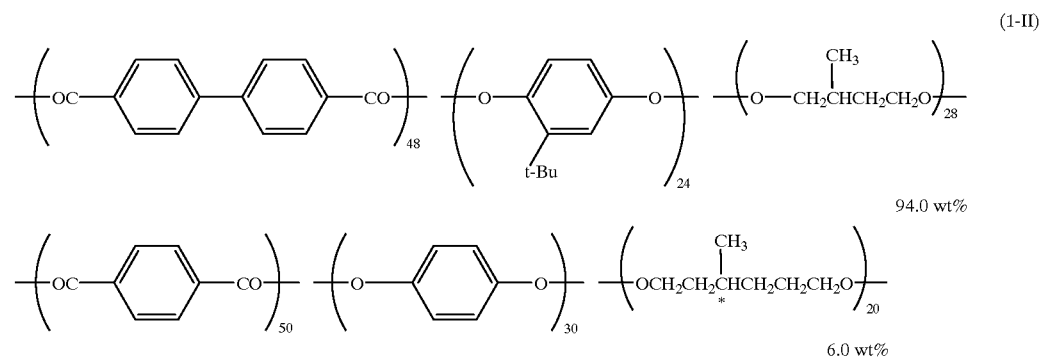

The * mark represents an optically active carbon.

(Preparation Example 2-3 of Liquid Crystalline Polymer Solution)

There was prepared a 20 wt % solution in phenol/tetrachloroethane (60/40 weight ratio) of the polymer mixture represented by the following formula (2-III):

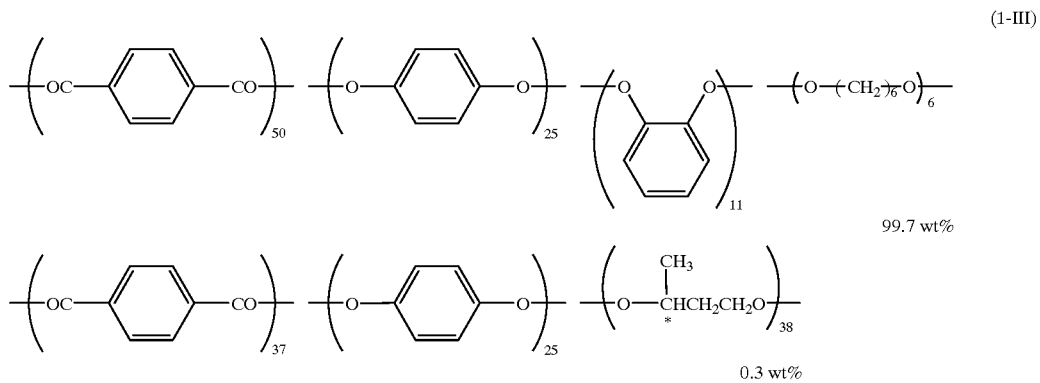

The * mark represents an optically active carbon.

Preparation Example 2-4 of Liquid Crystalline Polymer Solution)

There was prepared a 20 wt % solution in phenol/tetrachloroethane (60/40 weight ratio) of a polymer mixture represented by the following formula (2-IV):

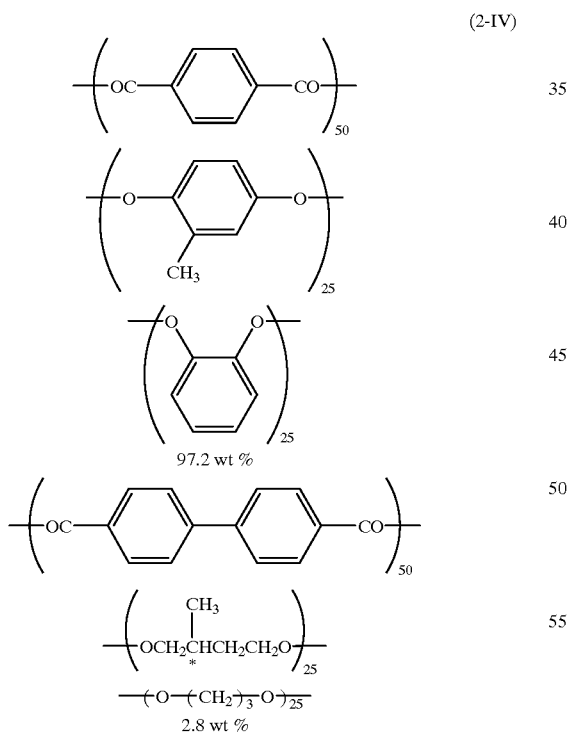

The * mark represents an optically active carbon.

(Preparation Example 2-5 of Liquid Crystalline Polymer Solution)

There was prepared a 20 wt % solution in phenol/tetrachloroethane (60/40 weight ratio) of a single polymer represented by the following formula (2-V):

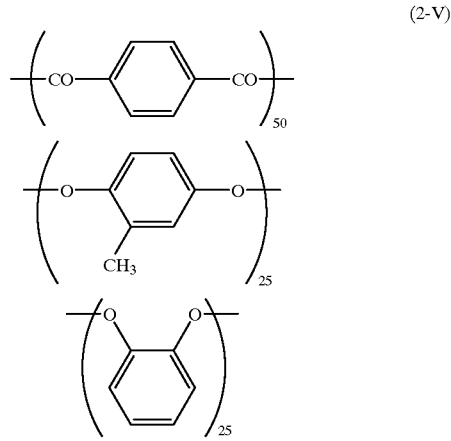

Production Example 1

The apparatus shown in FIG. 1 was used. While a polyether ether ketone (PEEK) film having a width of 20 cm and a thickness of 80 μm, serving as an orienting substrate, was moved at a rate of 20 m/min, a rubbing roll having a diameter of 150 mm and with nylon cloth wound thereon was set at 45° relative to the MD direction of the PEEK film and was rotated at 1,500 rpm and at a pushing-in amount of 500 μm of fiber tips of the nylon cloth. In this way rubbing was performed continuously and the rubbed film was taken up onto a roll.

The polymer solution prepared in Preparation Example 2-1 was applied onto the rubbed, long film by the roll coating method, then dried and heated at 100° C. for 20 minutes to fix the orientation of the liquid crystalline polymer.

This film was transferred onto a transparent, 100 μm thick, triacetyl cellulose (TAC) film having an acrylic pressure-sensitive adhesive pre-applied thereto, in accordance with a conventional method, and then observed usi a polarizing microscope. As a result, a dark field appeared at every 180° as an angle of rotation, thus indicating that the orientation was complete. At this time, the direction perpendicular to the transmission axis of the polarizer was 45° direction relative to the MD direction of the PEEK film.

Twist angle and Δn·d of the compensating layer obtained were −228° and 0.835 μm, respectively.

In this manner there was obtained a long laminate sheet of a three-layer structure comprising liquid crystalline polymer (formula 2-I) layer/acrylic pressure-sensitive adhesive layer/TAC film.

Production Example 2

The apparatus shown in FIG. 1 was used. While a (PEEK) film having a width of 20 cm and a thickness of 50 μm, serving as an orienting substrate, was moved at a rate of 20 m/min, a rubbing roll having a diameter of 150 mm and with nylon cloth wound thereon was set at 45° relative to the MD direction of the PEEK film and was rotated at 1,500 rpm and at a pushing-in amount of 500 μm of fiber tips of the nylon cloth.

In this way rubbing was performed continuously and the rubbed film was taken up onto a roll.

The polymer solution prepared in Preparation Example 2-2 was applied onto the rubbed, long film by the slot die coating method, then dried and heated at 200° C. for 45 minutes to fix the orientation of the liquid crystalline polymer.

This film was transferred onto a transparent, 100 μm thick, polyether sulfone (PES) film using an acrylic adhesive in accordance with a conventional method, and then observed through a polarizing microscope to find that a dark field appeared at every 180° as an angle of rotation. Thus, the orientation proved to be complete. At this time, the direction perpendicular to the transmission axis of the polarizer was 45° direction relative to the MD direction of the PEEK film.

In this manner there was obtained a long laminate sheet of a three-layer structure comprising liquid crystalline polymer (formula 2-II) layer/acrylic adhesive layer/PES film.

Twist angle and Δn·d of the compensating layer obtained were −231° and 0.84 μm, respectively.

Production Example 3

The apparatus shown in FIG. 1 was used. While a (PEEK) film having a width of 20 cm and a thickness of 50 μm, serving as an orienting substrate, was moved at a rate of 20 in/min, a rubbing roll having a diameter of 150 mm and with nylon cloth wound thereon was set at 45° relative to the MD direction of the PEEK film and was rotated at 1,500 rpm and at a pushing-in amount of 500 μm of fiber tips of the nylon cloth.

In this way rubbing was performed continuously and the rubbed film was taken up onto a roll.

The polymer solution prepared in Preparation. Example 2-3 was applied onto the rubbed, long film by means of a roll coater, then dried and heated at 200° C. for 20 minutes to fix the orientation of the liquid crystalline polymer.

Then, a TAC film with an acrylic adhesive as an ultraviolet curing adhesive applied thereto was laminated onto the liquid crystalline polymer layer and thereafter irradiated with ultraviolet light from the outside to cure the adhesive, thereby bonding the liquid crystalline polymer layer and the TAC film with each other.

Subsequent separation from the PEEK film and transfser afforded a long laminate sheet of a three-layer structure comprising liquid crystalline polymer (formula 2-III) layer/photocured acrylic adhesive layer/TAC film.

The orientation proved to be complete because a dark field appeared at every 180° as an angle of rotation. At this time, the direction perpendicular to the transmission axis of the polarizer was 45° direction relative to the MD direction of the PEEK film.

Twist angle and Δn·d of the compensating layer obtained were −90° and 2.0 μm, respectively.

Production Example 4

The apparatus shown in FIG. 1 was used. While a polyimide film having a width of 20 cm and a thickness of 125 μm, serving as an orienting substrate, was moved at a rate of 20 m/min, a rubbing roll having a diameter of 150 mm and with nylon cloth wound thereon was set at 45° relative to the MD direction of the PEEK film and was rotated at 1,500 rpm and at a pushing-in amount of 500 μm as of fiber tips of the nylon cloth. In this way rubbing was performed continuously and the rubbed film was taken up onto a roll.

The polymer solution prepared in Preparation Example 2-4 was cast over the rubbed, long film by means of the die coater, then dried and heated at 200° C. for 40 minutes to fix the orientation of the liquid crystalline polymer.

Then, a TAC film with an acrylic adhesive as an ultraviolet curing adhesive applied thereto was laminated onto the liquid crystalline polymer layer and thereafter irradiated with ultraviolet light from the outside to cure the adhesive, thereby bonding the liquid crystalline polymer layer and the TAC film with each other.

Subsequent separation from the polyimide film and transfser afforded a long laminate sheet of a three-layer structure comprising liquid crystalline polymer (formula 2-IV) layer/photocured acrylic adhesive layer/TAC film.

The orientation proved to be complete because a dark field appeared at every 180° as an angle of rotation. At this time, the angle perpendicular to the transmission axis of the polarizer was 45° direction relative to the MD direction of the polyimide film.

Twist angle and Δn·d of the compensating layer obtained were −231° and 0.84 μm, respectively.

In this manner there was obtained a long laminate sheet of a -three-layer structure comprising liquid crystalline polymer (formula 2-IV) layer/photocured acrylic adhesive layer/TAC film.

Example 2-1

A solution of an ultraviolet or electron beam curing type acrylic oligomer described in Table 1 was applied by the slot die coating method onto the surface of the liquid crystalline polymer layer in the three-layer laminate sheet obtained in Production Example 1 and comprising liquid crystalline polymer (formula 2-I) layer/acrylic pressure-sensitive adhesive layer, and was then irradiated with ultraviolet light or electron beam to polymerize and cure the acrylic oligomer.

The thickness of the cured acrylic resin layer was about 5 µm.

In this way there was obtained a long laminate sheet of a four-layer structure comprising cured acrylic resin layer/ liquid crystalline polymer (formula 2-I) layer/acrylic pressure-sensitive adhesive layer/TAC film.

Samples obtained in this manner were subjected to a high-temperature and high-humidity test (60° C., 90% RH, 500 hours) and were measured for optical parameters and surface layer hardness (pencil hardness). The results obtained are as shown in Table 1. These tests and measurements were also conducted in the following Examples.

Example 2-2

A solution of an ultraviolet or electron beam curing type acrylic oligomer described in Table 1 was applied by the certain coating method onto the surface of the liquid crystalline polymer layer in the three-layer laminate sheet obtained in Production Example 1 and comprising liquid crystalline polymer (formula 2-I) layer/acrylic pressure-sensitive adhesive layer/TAC film then a 100 m thick TAC film was laminated to the thus coated laminate sheet, followed by radiation of ultraviolet light for curing, to afford a long laminate sheet of a five-layer structure comprising TAC film/cured acrylic resin layer/liquid crystalline polymer (formula 2-I) layer/pressure-sensitive adhesive layer/TAC film.

Example 2-3

A solution of an ultraviolet or electron bean curing type acrylic oligomer described in Table 1 was applied using a bar coater onto the surface of the liquid crystalline polymer layer in the three-layer laminate sheet obtained in Production Example 2 and comprising liquid crystalline polymer (formula 2-II) layer/acrylic adhesive layer/PES film, and then irradiated with ultraviolet light or electron beam to polymerize and cure the acrylic oligomer.

The thickness of the cured acrylic resin layer was about 10 µm

In this way there was obtained a long laminate sheet of a four-layer structure comprising cured acrylic resin (10 µm thick)/liquid crystalline polymer (formula 2-II) layer/acrylic adhesive layer/PES film.

Example 2-4

A solution of an ultraviolet curing type acrylic oligomer described in Table 1 was applied using a roll coater onto the surface of the liquid crystalline polymer layer in the three-layer laminate sheet obtained in Production Example 2 and comprising liquid crystalline polymer (formula 2-II) layer/ acrylic adhesive layer/PES film, then a 100 µm thick TAC film was laminated to the thus-coated laminate sheet, followed by radiation of ultraviolet light for curing, to afford a long laminate sheet of a five-layer structure comprising TAC film/cured acrylic resin layer/liquid crystalline polymer (formula 2-II) layer/acrylic adhesive layer/PES film.

Example 2-5

A solution of an ultraviolet or electron beam curing type acrylic oligomer described in Table 1 was applied using a bar coater onto the surface of the liquid crystalline polymer layer in the three-layer laminate sheet obtained in Production Example 3 and comprising liquid crystalline polymer (formula 2-III) layer/photocured acrylic adhesive layer/TAC film, and then irradiated with ultraviolet light or electron beam to polymerize and cure the acrylic oligomer.

The thickness of the cured acrylic resin layer was about 10 µm

In this way there was obtained a long laminate sheet of a four-layer structure comprising cured acrylic resin layer (5 µm thick)/liquid crystalline polymer (formula 2-III) layer/ acrylic adhesive layer/TAC film.

Example 2-6

A solution of an ultraviolet or electron beam curing type acrylic oligomer described in Table 1 was applied using a bar coater onto the surface of the liquid crystalline polymer layer in the three-layer laminate sheet obtained in Production Example 3 and comprising liquid crystalline polymer layer (formula 2-III)/photocured acrylic adhesive layer/TAC film, then a TAC film was laminated to the coated layer, followed by radiation of ultraviolet light for curing, to affored a long laminate sheet of a five-layer structure comprising TAC film/cured acrylic resin layer (10 µm thick)/ liquid crystalline polymer (formula 2-III) layer/photocured acrylic adhesive layer/TAC film.

Example 2-7

A solution of an ultraviolet or electron beam curing type acrylic oligomer described in Table 1 was applied using a bar coater onto the surface of the liquid crystalline polymer layer in the three-layer laminate sheet obtained in Production Example 4 and comprising liquid crystalline polymer layer (formula 2-IV)/photocured acrylic adhesive layer/TAC film, and then irradiated with ultraviolet light for curing, to affored a long laminate sheet of a four-layer structure comprising cured acrylic resin layer (10 µm thick)/liquid crystalline polymer (formula 2-IV) layer/photocured acrylic adhesive layer/TAC film.

Example 2-8

Using the polymer solution prepared in Preparation Example 2-5 and in the same way as in Production Example 1 and Example 2-1 there was obtained a long laminate sheet of a four-layer structure comprising cured acrylic resin layer/liquid crystalline polymer (formula 2-V) layer/acrylic pressure-sensitive adhesive layer/TAC film. Since the liquid crystalline polymer layer (formula 2-V) layer did not have a twist structure, it was employable, for example, as a retardation plate not requiring a twist structure.

The laminate sheets obtained in Examples 2-1 to 2-8 were subjected to the high-temperature and high-humidity test referred to previously and measured for surface hardness, the results of which are shown together in Table 1.

TABLE 1

| Example | Structure | Curing Resin | Curing Method | High-Temperature High-Humidity Test | Optical Parameter Twist Angle (°) | Δn · d μm | Surface Hardness |
|---|---|---|---|---|---|---|---|
| 2-1 | 4 layers | Commercial product 1 | UV light | neither peeling nor foaming | −228 | 0.837 | HB |
|  |  | Commercial product 2 | UV light | neither peeling nor foaming | −229 | 0.838 | H |
|  |  | Commercial product 3 | electron beam | neither peeling nor foaming | −229 | 0.836 | H |
| 2-2 | 5 layers | Commercial product 1 | UV light | neither peeling nor foaming | −229 | 0.838 | — |
| 2-3 | 4 layers | Commercial product 1 | UV light | neither peeling nor foaming | −230 | 0.840 | HB |
|  |  | Commercial product 2 | UV light | neither peeling nor foaming | −229 | 0.838 | H |
|  |  | Commercial product 3 | electron beam | neither peeling nor foaming | −229 | 0.840 | H |
| 2-4 | 5 layers | Commercial product 1 | UV light | neither peeling nor foaming | −231 | 0.839 | — |
|  |  | Commercial product 2 | UV light | neither peeling nor foaming | −230 | 0.839 | — |
| 2-5 | 4 layers | Commercial product 1 | UV light | neither peeling nor foaming | −90 | 2.1 | H |
|  |  | Commercial product 2 | UV light | neither peeling nor foaming | −90 | 2.1 | H |
|  |  | Commercial product 3 | electron beam | neither peeling nor foaming | −90 | 2.1 | H |
| 2-6 | 5 layers | Commercial product 1 | UV light | neither peeling nor foaming | −90 | 2.1 | — |
| 2-7 | 4 layers | Commercial product 1 | UV light | neither peeling nor foaming | −230 | 0.85 | H |
|  |  | Commercial product 2 | UV light | neither peeling nor foaming | −231 | 0.849 | H |
|  |  | Commercial product 3 | electron beam | neither peeling nor foaming | −230 | 0.85 | H |
| 2-8 | 4 layers | Commercial product 1 | electron beam | neither peeling nor foaming | — | 0.85 | H |

(Note):
Commercial product 1: a commercially available ultraviolet curing type acrylic oligomer adhesive
Commercial product 2: a commercially available ultraviolet curing type acrylic monomer adhesive
Commercial product 3: a commercially available electron beam curing type acrylic oligomer adhesive

What is claimed is:

1. An elongate liquid crystalline polymer film comprising a liquid crystalline polymer film whose length is longer than its width wherein the angle of orientation of the polymer molecules is oblique to the longitudinal axis of said film.

2. An elongate film in accordance with claim 1 wherein said liquid crystalline polymer of said film exhibits uniform nematic or twisted nematic orientation in the liquid crystalline state and a glassy state at temperatures below the liquid crystalline transition temperature of said liquid crystalline polymer.

3. An elongate film in accordance with claim 2 wherein said film has a length of up to 10,000 meters.

4. An elongate laminate sheet comprising said liquid crystalline polymer film of claim 1 and a polarizing film which comprises a stretched polymeric film.

5. An elongate laminate sheet comprising a laminate of a cured acrylic layer exhibiting isotropy, said liquid crystalline polymer film of claim 1, an adhesive layer and a light transmitting substrate layer, wherein said layers are laminated to each other in the order recited.

6. An elongate laminate sheet in accordance with claim 5 wherein said adhesive layer is a pressure sensitive adhesive layer.

7. An optical element comprising a discrete length of said laminate sheet of claim 4.

8. An optical element comprising a discrete length of said laminate sheet of claim 5.

9. A process for the continuous production of an elongate liquid crystalline polymer film comprising orienting a substrate between a first and second roller, wherein said second roller rotates at a greater speed than first roller; disposing a rubbing roller adjacent a section of said substrate; and applying a liquid crystalline polymer on said oblique oriented substrate at an oblique angle to said substrate, said rubbing roller disposed adjacent to said substrate between said first and said second roller, wherein said substrate is obliquely oriented relative to the longitudinal axis of said substrate; and applying a liquid crystalline polymer on said obliquely oriented substrate.

10. A process in accordance with claim 9 wherein said angle of said oblique orientation relative to the longitudinal axis is adjustable.

11. A process for the continuous production of an elongate laminate sheet comprising orienting a substrate between a first and a second roller, wherein said second roller rotates at a greater speed than said first roller; disposing a rubbing roller adjacent a section of said substrate at an oblique angle to said substrate, said rubbing roller disposed adjacent said substrate between said first and said second rollers, wherein said substrate is obliquely oriented relative to the longitudinal axis of said substrate; applying a liquid crystalline polymer on said oriented substrate, wherein a liquid crystalline polymer film is formed; bonding a curable acrylic layer exhibiting optical isotropy to said liquid crystalline polymer film; coating said curable acrylic layer with an adhesive layer; and bonding said adhesive layer to a light transmitting layer.

12. A process in accordance with claim 11 wherein said elongate laminate sheet is cut into discrete lengths.

* * * * *